US011918527B2

(12) United States Patent
Newman et al.

(10) Patent No.: US 11,918,527 B2
(45) Date of Patent: Mar. 5, 2024

(54) ADJUSTABLE SLING BARS FOR SUBJECT LIFTING SYSTEMS AND METHODS FOR OPERATING THE SAME

(71) Applicant: Liko Research & Development AB, Luleå (SE)

(72) Inventors: Jesse Newman, Batesville, IN (US); Marcus Linde, Öjbeyn (SE); Andrew Dole, Batesville, IN (US); Jeffrey Scott Jelinek, Batesville, IN (US); Jonathan D. Turner, Dillsboro, IN (US); Jonathan K. Moenter, Batesville, IN (US); Sriharsha Garapati, Batesville, IN (US)

(73) Assignee: LIKO RESEARCH & DEVELOPMENT AB, Luleå (SE)

( * ) Notice: Subject to any disclaimer, the term of this patent is extended or adjusted under 35 U.S.C. 154(b) by 30 days.

(21) Appl. No.: 17/579,684

(22) Filed: Jan. 20, 2022

(65) Prior Publication Data

US 2022/0133570 A1 May 5, 2022

Related U.S. Application Data

(63) Continuation of application No. 16/695,518, filed on Nov. 26, 2019, now Pat. No. 11,259,976.
(Continued)

(51) Int. Cl.
*A61G 7/10* (2006.01)
*B66C 1/14* (2006.01)
(Continued)

(52) U.S. Cl.
CPC ............. *A61G 7/1051* (2013.01); *A61G 7/10* (2013.01); *A61G 7/1015* (2013.01);
(Continued)

(58) Field of Classification Search
CPC ...... A61G 7/1051; A61G 7/10; A61G 7/1015; A61G 7/1023; A61G 7/1038;
(Continued)

(56) References Cited

U.S. PATENT DOCUMENTS 4,136,903 A 1/1979 Roethler
6,085,368 A * 7/2000 Robert ................. A61G 7/1051 74/400

(Continued)

FOREIGN PATENT DOCUMENTS

CN 202154910 U 3/2012
DE 29505191 U1 6/1995

OTHER PUBLICATIONS

U.S. Appl. No. 16/695,518, filed Nov. 26, 2019, Jesse Newman et al.

(Continued)

*Primary Examiner* — Justin C Mikowski
*Assistant Examiner* — Madison Emanski
(74) *Attorney, Agent, or Firm* — Dinsmore & Shohl LLP

(57) ABSTRACT

A sling bar assembly allows variable positioning of a sling on the sling bar assembly. Some sling bar assemblies include opposing sling bar members that are movable with respect to one another in a lateral direction. Some opposing sling bar members are repositionable between a locked position, in which movement of the sling members with respect to one another is restricted, and an unlocked position. Some sling bar assemblies include multiple sling hooks positioned on a sling bar member. Some sling bar assemblies include a biasing member that permits movement of a sling hook with respect to the sling bar assembly in the lateral direction.

18 Claims, 17 Drawing Sheets

Related U.S. Application Data

(60) Provisional application No. 62/856,960, filed on Jun. 4, 2019, provisional application No. 62/772,697, filed on Nov. 29, 2018.

(51) Int. Cl.
*B66C 1/16* (2006.01)
*B66C 1/12* (2006.01)

(52) U.S. Cl.
CPC ......... *A61G 7/1023* (2013.01); *A61G 7/1038* (2013.01); *A61G 7/1046* (2013.01); *A61G 7/1061* (2013.01); *B66C 1/14* (2013.01); *B66C 1/16* (2013.01); *B66C 1/12* (2013.01)

(58) Field of Classification Search
CPC ................ A61G 7/1046; A61G 7/1061; A61G 2200/34; A61G 2203/78; A61G 7/1017; B66C 1/12; B66C 1/42; B66C 1/14; B66C 1/16
See application file for complete search history.

(56) References Cited

U.S. PATENT DOCUMENTS

| | | | | |
|---|---|---|---|---|
| 6,675,412 | B2 | 1/2004 | Faucher et al. | |
| 9,222,498 | B2 | 12/2015 | Faucher et al. | |
| 9,700,474 | B2 | 7/2017 | Karlsson et al. | |
| 2003/0200607 | A1 * | 10/2003 | Faucher | B66D 3/26 5/81.1 R |
| 2011/0185495 | A1 | 8/2011 | Jones et al. | |
| 2011/0219538 | A1 * | 9/2011 | McWattie | A61G 7/1061 5/87.1 |

OTHER PUBLICATIONS

Extended European Search Report dated Mar. 26, 2020 relating to U.S. Application 19210189.7-1113.

* cited by examiner

ADJUSTABLE SLING BARS FOR SUBJECT LIFTING SYSTEMS AND METHODS FOR OPERATING THE SAME

CROSS-REFERENCE TO RELATED APPLICATIONS

This application is a continuation of U.S. Non-Provisional application Ser. No. 16/695,518 filed Nov. 26, 2019, and entitled "Adjustable Sling Bars for Subject Lifting Systems and Methods for Operating the Same", which claims the benefit of U.S. Provisional Application Ser. No. 62/772,697 filed Nov. 29, 2018, and entitled "Adjustable Sling Bars for Subject Lifting Systems and Methods for Operating the Same" and U.S. Provisional Patent Application Ser. No. 62/856,960 filed Jun. 4, 2019, and entitled "Adjustable Sling Bars for Subject Lifting System and Methods for Operating the Same," the contents each of which are incorporated by reference in their entirety.

FIELD

The present specification generally relates to adjustable sling bars for subject lifting systems, such as mobile lifts and/or overhead lifts, and methods for operating the same.

TECHNICAL BACKGROUND

Subject lifting systems, such as mobile lifts and overhead lifts, are used to transport subjects for any number of reasons. Overhead lifts may be mounted to a ceiling and operate like a winch, and may include a motor and a lift drum that is driven by the motor. A lift strap may be coupled to the lift drum for lifting and lowering a subject when the drum is rotated. For example, as the lift drum rotates, the lift strap is either wound up onto the lift drum, or paid out from the lift drum. Mobile lifts may include a lift device positioned on one or more wheels to transport a subject from one location to another. A sling bar may be attached to the overhead lifts and the mobile lifts to connect a subject to the overhead lift or the mobile lift. For example, an accessory such as a sling, a vest, or the like, may be attached to a subject, and the accessory may be coupled to the sling bar to connect the subject to the overhead lift or the mobile lift.

Conventional sling bars have defined sizes, such that different sling bars may be utilized with different sized subjects and/or with different sized accessories. For example, smaller sling bars may be utilized with smaller subjects using narrower accessories, and may not generally be suitable for use with larger subjects. Similarly, larger sling bars may be utilized with larger subjects using larger accessories, and may not generally be suitable for use with smaller subjects. As such, conventional sling bars may only be utilized with certain subjects and/or with certain accessories, requiring care givers to correlate appropriate sling bars with appropriate subjects/accessories, and requiring that care facilities stock and maintain multiple varieties of sling bars.

Accordingly, a need exists for alternative sling bars that may be adjusted to accommodate different subjects.

SUMMARY

A first aspect A1 includes a sling bar assembly including a lift engagement member for selectively coupling to a subject support lift, and opposing sling bar members slidably engaged with the lift engagement member, where the sling bar members each comprise a sling hook positioned at an outboard end of each of the sling bar members in a lateral direction, and the sling bar members are selectively engaged with one another and are repositionable between a locked position, in which movement of the sling bar members with respect to one another is restricted in the lateral direction, and an unlocked position, in which the sling bar members are movable with respect to one another in the lateral direction.

A second aspect A2 includes the sling bar assembly of aspect A1, where one of the sling bar members comprises a plurality of slots extending in the lateral direction along the sling bar member, and the other sling bar member is selectively engaged with the plurality of slots in the locked position.

A third aspect A3 includes the sling bar assembly of aspect A2, where the sling bar member comprising the plurality of slots further defines a cavity extending inward into the sling bar member in a direction transverse to the lateral direction, the cavity defining the plurality of slots.

A fourth aspect A4 includes the sling bar assembly of aspect A3, where the sling bar member comprising the plurality of slots is a first sling bar member, and the other of the sling bar members comprises an outwardly-extending engagement member positioned within the cavity of the first sling bar member.

A fifth aspect A5 includes the sling bar assembly of aspect A4, where the cavity defines a guide portion positioned below and spaced apart from the plurality of slots, and the outwardly-extending engagement member is positioned within the guide portion in the unlocked position.

A sixth aspect A6 includes the sling bar assembly of aspect A5, where the guide portion of the cavity defines a height that is greater than a height of the outwardly-extending engagement member.

A seventh aspect A7 includes the sling bar assembly of any of aspects A1-A6, further comprising a lateral governor positioned between and engaged with the sling bar members, where the lateral governor permits movement of the sling bar members in opposite directions and restricts movement of the sling bar members in the same direction.

An eighth aspect A8 includes the sling bar assembly of aspect A7, where the lateral governor comprises a pinion and the sling bar members each comprise a rack engaged with the pinion.

A ninth aspect A9 includes the sling bar assembly of aspect A8, where the pinion is coupled to the lift engagement member.

A tenth aspect A10 includes a subject support lift comprising a lift actuator, a sling bar assembly selectively coupled to and removable from the lift actuator, the sling bar assembly comprising a lift engagement member selectively coupled to the lift actuator, and opposing sling bar members slidably engaged with the lift engagement member, where the sling bar members each comprise a sling hook positioned at an outboard end of each of the sling bar members in a lateral direction, and the sling bar members are selectively engaged with one another and are repositionable between a locked position, in which movement of the sling bar members with respect to one another is restricted in the lateral direction, and an unlocked position, in which the sling bar members are movable with respect to one another in the lateral direction.

An eleventh aspect A11 includes the subject support lift of aspect A10, where one of the sling bar members comprises a plurality of slots extending in the lateral direction along the sling bar member, and the other sling bar member is selectively engaged with the plurality of slots in the locked position.

A twelfth aspect A12 includes the subject support lift of aspect A11, where the sling bar member comprising the plurality of slots further defines a cavity extending inward into the sling bar member in a direction transverse to the lateral direction, the cavity defining the plurality of slots.

A thirteenth aspect A13 includes the subject support lift of aspect A12, where the sling bar member comprising the plurality of slots is a first sling bar member, and the other of the sling bar members comprises an outwardly-extending engagement member positioned within the cavity of the first sling bar member.

A fourteenth aspect A14 includes the subject support lift of aspect A13, where the cavity defines a guide portion positioned below and spaced apart from the plurality of slots, and the outwardly-extending engagement member is positioned within the guide portion in the unlocked position.

A fifteenth aspect A15 includes the subject support lift of aspect A14, where the guide portion of the cavity defines a height that is greater than a height of the outwardly-extending engagement member.

A sixteenth aspect A16 includes the subject support lift of any of aspects A10-A15, further comprising a lateral governor positioned between and engaged with the sling bar members, where the lateral governor permits movement of the sling bar members in opposite directions and restricts movement of the sling bar members in the same direction.

A seventeenth aspect A17 includes the subject support lift of aspect A16, where the lateral governor comprises a pinion and the sling bar members each comprise a rack engaged with the pinion.

An eighteenth aspect A18 includes the subject support lift of aspect A17, where the pinion is coupled to the lift engagement member.

A nineteenth aspect A19 includes a sling bar assembly comprising a lift engagement member, a first sling bar member slidably engaged with the lift engagement member, the first sling bar member comprising a first bar body defining a first plurality of slots extending in a lateral direction along the first bar body, a first sling hook positioned at an outboard end of the first bar body, and a first engagement member extending outward from the first bar body, and a second sling bar member slidably engaged with the lift engagement member, the second sling bar member comprising a second bar body defining a second plurality of slots extending in the lateral direction along the second bar body, a second sling hook positioned at an outboard end of the second bar body, and a second engagement member extending outward from the second bar body, where the first engagement member is selectively engaged with a slot of the second plurality of slots of the second bar body, and the second engagement member is selectively engaged with a slot of the first plurality of slots of the first bar body.

A twentieth aspect A20 includes the sling bar assembly of aspect A19, where the first plurality of slots of the first bar body and the second plurality of slots of the second bar body are oriented to face downward in a vertical direction.

A twenty-first aspect A21 includes the sling bar assembly of either aspects A19 or A20, where the first bar body defines a cavity extending into the first bar body, and the cavity defines the first plurality of slots.

A twenty-second aspect A22 includes the sling bar assembly of aspect A21, where the cavity further defines a guide portion positioned opposite and spaced apart from the first plurality of slots, the guide portion defining a height evaluated in a vertical direction that is greater than a height of the second engagement member evaluated in the vertical direction.

A twenty-third aspect A23 includes the sling bar assembly of any of aspects A19-A22, further comprising a lateral governor positioned between and engaged with the first sling bar member and the second sling bar member, where rotation of the lateral governor moves the first sling bar member and the second sling bar member in opposing directions.

A twenty-fourth aspect A24 includes the sling bar assembly of aspect A23, where the lateral governor comprises a pinion positioned between and engaged with the first sling bar member and the second sling bar member.

A twenty-fifth aspect A25 includes a subject support lift comprising a lift actuator, a sling bar assembly selectively coupled to and removable from the lift actuator, the sling bar assembly comprising a lift engagement member, a first sling bar member slidably engaged with the lift engagement member, the first sling bar member comprising a first bar body defining a first plurality of slots extending in a lateral direction along the first bar body, a first sling hook positioned at an outboard end of the first bar body, and a first engagement member extending outward from the first bar body, and a second sling bar member slidably engaged with the lift engagement member, the second sling bar member comprising a second bar body defining a second plurality of slots extending in the lateral direction along the second bar body, a second sling hook positioned at an outboard end of the second bar body, and a second engagement member extending outward from the second bar body, where the first engagement member is selectively engaged with a slot of the second plurality of slots of the second bar body, and the second engagement member is selectively engaged with a slot of the first plurality of slots of the first bar body.

A twenty-sixth aspect A26 includes the subject support lift of aspect A25, where the first plurality of slots of the first bar body and the second plurality of slots of the second bar body are oriented to face downward in a vertical direction.

A twenty-seventh aspect A27 includes the subject support lift of either aspects A25 or A26, where the first bar body defines a cavity extending into the first bar body, and the cavity defines the first plurality of slots.

A twenty-eighth aspect A28 includes the subject support lift of aspect A27, where the cavity further defines a guide portion positioned opposite and spaced apart from the first plurality of slots, the guide portion defining a height evaluated in a vertical direction that is greater than a height of the second engagement member evaluated in the vertical direction.

A twenty-ninth aspect A29 includes the subject support lift of any of aspects A25-A28, further comprising a lateral governor positioned between and engaged with the first sling bar member and the second sling bar member, where rotation of the lateral governor moves the first sling bar member and the second sling bar member in opposing directions.

A thirtieth aspect A30 includes the subject support lift of aspect A29, where the lateral governor comprises a pinion positioned between and engaged with the first sling bar member and the second sling bar member.

A thirty-first aspect A31 includes a sling bar assembly comprising a lift engagement member for selectively coupling to a subject support lift, opposing sling bar members slidably engaged with the lift engagement member, where the sling bar members each comprise a sling hook positioned at an outboard end of each of the sling bar members in a lateral direction, and where at least one of the sling bar members define a cavity extending into the sling bar member, an engagement member that is positionable within the cavity, and a lateral governor positioned between and engaged with the opposing sling bar members, where the lateral governor moves the opposing sling bar members in opposing directions.

A thirty-second aspect A32 includes the sling bar assembly of aspect A31, where each of the sling bar members comprise a rack extending in the lateral direction, and where the lateral governor comprises a pinion positioned between and engaged with the racks of the opposing sling bar members.

A thirty-third aspect A33 includes the sling bar assembly of either of aspects A31 or A32, where the cavity comprises a groove extending in the lateral direction, and the engagement member is slidably engaged with the groove.

A thirty-fourth aspect A34 includes the sling bar assembly of any of aspects A31-A33, further comprising a sling bar frame coupled to the lift engagement member and positioned between the opposing sling bar members, where the engagement member is coupled to and extends outward from the sling bar frame.

A thirty-fifth aspect A35 includes the sling bar assembly of aspect A34, further comprising a first plurality of engagement members extending outward from the sling bar frame and engaged with the cavity of one of the sling bar members, and a second plurality of engagement members extending outward from the sling bar frame and engaged with the cavity of the other of the sling bar members.

A thirty-sixth aspect A36 includes the sling bar assembly of any of aspects A31-A35, where the cavity extending into the at least one of the sling bar members is a first cavity, and the at least one of the sling bar members comprises a second cavity positioned below the first cavity in a vertical direction.

A thirty-seventh aspect A37 includes the sling bar assembly of any of aspects A31-A36, further comprising a biasing member engaged with at least one of the opposing sling bar members, where the biasing member biases the at least one of the opposing sling bar members toward the lift engagement member.

A thirty-eighth aspect A38 includes the sling bar assembly of aspect A37, where the sling bar members are repositionable between a locked position, in which movement of the sling bar members with respect to one another is restricted in the lateral direction, and an unlocked position, in which the sling bar members are movable with respect to one another in the lateral direction.

A thirty-ninth aspect A39 includes the sling bar assembly of any of aspects A31-A38, where the engagement member is selectively positioned at least partially within the cavity and restricts movement of the sling bar members with respect to one another in the lateral direction when positioned at least partially within the cavity.

A fortieth aspect A40 includes the sling bar assembly of aspect A39, where the engagement member comprises a detent selectively positioned at least partially within the cavity.

A forty-first aspect A41 includes the sling bar assembly of any of aspects A31-A40, where one of the sling bar members comprises a plurality of slots extending in the lateral direction along the sling bar member, and the other sling bar member is selectively engaged with the plurality of slots in a locked position.

A forty-second aspect A42 includes the sling bar assembly of aspect A41, where the cavity of the sling bar member comprising the plurality of slots defines a guide portion positioned below and spaced apart from the plurality of slots, and the engagement member is positioned within the guide portion in an unlocked position.

A forty-third aspect A43 includes the sling bar assembly of aspect A42, where the guide portion of the cavity defines a height that is greater than a height of the engagement member.

A forty-fourth aspect A44 includes the sling bar assembly of any of aspects A31-A43, where the engagement member positioned at least partially within and slidably engaged with the cavity of one of the sling bar members and is coupled to the other of the sling bar members.

A forty-fifth aspect A45 includes a subject support lift comprising a lift actuator, a sling bar assembly selectively coupled to and removable from the lift actuator, the sling bar assembly comprising a lift engagement member selectively coupled to the lift actuator, opposing sling bar members slidably engaged with the lift engagement member, where the sling bar members each comprise a sling hook positioned at an outboard end of each of the sling bar members in a lateral direction, and where at least one of the sling bar members define a cavity extending into the sling bar member, an engagement member that is positionable within the cavity, and a lateral governor positioned between and engaged with the opposing sling bar members, where the lateral governor moves the opposing sling bar members in opposing directions.

A forty-sixth aspect A46 includes the subject support lift of aspect A45, where each of the sling bar members comprise a rack extending in the lateral direction, and where the lateral governor comprises a pinion positioned between and engaged with the racks of the opposing sling bar members.

A forty-seventh aspect A47 includes the subject support lift of either aspect A45 or A46, where the cavity comprises a groove extending in the lateral direction, and the engagement member is slidably engaged with the groove.

A forty-eighth aspect A48 includes the subject support lift of any of aspects A45-A47, further comprising a sling bar frame coupled to the lift engagement member and positioned between the opposing sling bar members, where the engagement member is coupled to and extends outward from the sling bar frame.

A forty-ninth aspect A49 includes the subject support lift aspect A48, further comprising a first plurality of engagement members extending outward from the sling bar frame and engaged with the cavity of one of the sling bar members, and a second plurality of engagement members extending outward from the sling bar frame and engaged with the cavity of the other of the sling bar members.

A fiftieth aspect A50 includes the subject support lift of any of aspects A45-A49, where the cavity extending into the at least one of the sling bar members is a first cavity, and the at least one of the sling bar members comprises a second cavity positioned below the first cavity in a vertical direction.

A fifty-first aspect A51 includes the subject support lift of any of aspects A45-A50, further comprising a biasing member engaged with at least one of the opposing sling bar members, where the biasing member biases the at least one of the opposing sling bar members toward the lift engagement member.

A fifty-second aspect A52 includes the subject support lift of any of aspects A45-A51, where the sling bar members are repositionable between a locked position, in which movement of the sling bar members with respect to one another is restricted in the lateral direction, and an unlocked position, in which the sling bar members are movable with respect to one another in the lateral direction.

A fifty-third aspect A53 includes the subject support lift of any of aspects A45-A52, where the engagement member is selectively positioned at least partially within the cavity and restricts movement of the sling bar members with respect to one another in the lateral direction when positioned at least partially within the cavity.

A fifty-fourth aspect A54 includes the subject support lift of aspect A53, where the engagement member comprises a detent selectively positioned at least partially within the cavity.

A fifty-fifth aspect A55 includes the subject support lift of any of aspects A45-A54, where one of the sling bar members comprises a plurality of slots extending in the lateral direction along the sling bar member, and the other sling bar member is selectively engaged with the plurality of slots in a locked position.

A fifty-sixth aspect A56 includes the subject support lift of aspect A55, where the cavity of the sling bar member comprising the plurality of slots defines a guide portion positioned below and spaced apart from the plurality of slots, and the engagement member is positioned within the guide portion in an unlocked position.

A fifty-seventh aspect A57 includes the subject support lift of aspect A56, where the guide portion of the cavity defines a height that is greater than a height of the engagement member.

A fifty-eighth aspect A58 includes the subject support lift of any of aspects A45-A57, where the engagement member positioned at least partially within and slidably engaged with the cavity of one of the sling bar members and is coupled to the other of the sling bar members.

A fifty-ninth aspect A59 includes a sling bar assembly comprising a lift engagement member for selectively coupling to a subject support lift, a sling bar member extending in a lateral direction and coupled to the lift engagement member, the sling bar member defining a first pair of sling hooks spaced apart from the lift engagement member by a first spacing distance, and a second pair of sling hooks spaced apart from the lift engagement member by a second spacing distance, where the second spacing distance is greater than the first spacing distance, at least one of a first pair of sensors and a first pair of indicators associated with the first pair of sling hooks, at least one of a second pair of sensors and a second pair of indicators associated with the second pair of sling hooks, and an electronic control unit communicatively coupled to the at least one of the first pair of sensors and the first pair of indicators and the at least one of the second pair of sensors and the second pair of indicators.

A sixtieth aspect A60 includes the sling bar assembly of aspect A59, where the sling bar assembly comprises the first pair of sensors associated with the first pair of sling hooks and comprises the second pair of sensors associated with the second pair of sling hooks.

A sixty-first aspect A61 includes the sling bar assembly of aspect A60, where the electronic control unit is communicatively coupled to a lift actuator and comprises a processor and a non-transitory memory storing computer readable and executable instructions that, when executed by the processor, cause the electronic control unit to receive a signal from one of the first pair of sensors associated with one of the first pair of sling hooks indicative of a sling positioned in the one of the first pair of sling hooks, in response to receiving a signal from the one of the first pair of sensors associated with the other of the first pair of sling hooks indicative of the sling positioned in the other of the first pair of sling hooks, send a signal to the lift actuator permitting the lift actuator to move, and in response to the lack of a signal from the sensor associated with the other of the first pair of sling hooks indicative of the sling positioned in the other of the first pair of sling hooks, direct the lift actuator to the lift actuator to restrict movement of the lift actuator.

A sixty-second aspect A62 includes sling bar assembly of aspect A60, where the electronic control unit is communicatively coupled to a lift actuator and comprises a processor and a non-transitory memory storing computer readable and executable instructions that, when executed by the processor, cause the electronic control unit to receive a signal from one of the first pair of sensors associated with one of the first pair of sling hooks indicative of a sling positioned in the one of the first pair of sling hooks, correlate the received signal from the one of the first pair of sensors with a subject profile, determine whether the subject profile includes the first pair of sling hooks, in response to determining that the subject profile includes the first pair of sling hooks, send a signal to the lift actuator permitting the lift actuator to move, and in response to determining that the subject profile does not include the first pair of sling hooks, direct the lift actuator to the lift actuator to restrict movement of the lift actuator.

A sixty-third aspect A63 includes the sling bar assembly of any of aspects A59-A62, where the sling bar assembly comprises the first pair of sensors and the first pair of indicators associated with the first pair of sling hooks and comprises the second pair of sensors and the second pair of indicators associated with the second pair of sling hooks.

A sixty-fourth aspect A64 includes the sling bar assembly of aspect A63, where the electronic control unit comprises a processor and a non-transitory memory storing computer readable and executable instructions that, when executed by the processor, cause the electronic control unit to receive a signal from one of the first pair of sensors associated with one of the first pair of sling hooks indicative of a sling positioned in the one of the first pair of sling hooks, and in response to receiving the signal from the one of the first pair of sensors, direct an indicator of the first pair of indicators associated with the other of the first pair of sling hooks to engage.

A sixty-fifth aspect A65 includes the sling bar assembly of aspect A63, where the electronic control unit comprises a processor and a non-transitory memory storing computer readable and executable instructions that, when executed by the processor, cause the electronic control unit to determine whether the subject profile includes the first pair of sling hooks, in response to determining that the subject profile includes the first pair of sling hooks, send a signal to the first pair of indicators to engage.

A sixty-sixth aspect A66 includes the sling bar assembly of aspect A63, where the first pair of indicators and the second pair of indicators comprise a visual indicator.

A sixty-seventh aspect A67 includes a subject support lift comprising a lift actuator, a sling bar assembly selectively coupled to and removable from the lift actuator, the sling bar assembly comprising a lift engagement member selectively coupled to the lift actuator, a sling bar member extending in a lateral direction and coupled to the lift engagement member, the sling bar member defining a first pair of sling hooks spaced apart from the lift engagement member by a first spacing distance, and a second pair of sling hooks spaced apart from the lift engagement member by a second spacing distance, where the second spacing distance is greater than the first spacing distance, at least one of a first pair of sensors and a first pair of indicators associated with the first pair of sling hooks, at least one of a second pair of sensors and a second pair of indicators associated with the second pair of sling hooks, and an electronic control unit communicatively coupled to the at least one of the first pair of sensors and the first pair of indicators and the at least one of the second pair of sensors and the second pair of indicators.

A sixty-eighth aspect A68 includes the subject support lift of aspect A67, where the sling bar assembly comprises the first pair of sensors associated with the first pair of sling hooks and comprises the second pair of sensors associated with the second pair of sling hooks.

A sixty-ninth aspect A69 includes the subject support lift of aspect A68, where the electronic control unit is communicatively coupled to the lift actuator and comprises a processor and a non-transitory memory storing computer readable and executable instructions that, when executed by the processor, cause the electronic control unit to receive a signal from one of the first pair of sensors associated with one of the first pair of sling hooks indicative of a sling positioned in the one of the first pair of sling hooks, in response to receiving a signal from the sensor of the first pair of sensors associated with the other of the first pair of sling hooks indicative of the sling positioned in the other of the first pair of sling hooks, send a signal to the lift actuator permitting the lift actuator to move, and in response to the lack of a signal from the sensor associated with the other of the first pair of sling hooks indicative of the sling positioned in the other of the first pair of sling hooks, direct the lift actuator to restrict movement of the lift actuator.

A seventieth aspect A70 includes the subject support lift of any of aspects A67-A69, where the sling bar assembly comprises the first pair of sensors and the first pair of indicators associated with the first pair of sling hooks and comprises the second pair of sensors and the second pair of indicators associated with the second pair of sling hooks.

A seventy-first aspect A71 includes the subject support lift of aspect A70, where the electronic control unit comprises a processor and a non-transitory memory storing computer readable and executable instructions that, when executed by the processor, cause the electronic control unit to receive a signal from the sensor associated with one of the first pair of sling hooks indicative of a sling positioned in the one of the first pair of sling hooks, and in response to receiving the signal from the sensor, direct an indicator of the first pair of indicators associated with the other of the first pair of sling hooks to engage.

A seventy-second aspect A72 includes the subject support lift of aspect A71, where the first pair of indicators and the second pair of indicators comprise a visual indicator.

A seventy-third aspect A73 includes a sling bar assembly comprising a lift engagement member for selectively coupling to a subject support lift, a sling bar member extending in a lateral direction, where the sling bar member defines a channel extending in the lateral direction, a plunger positioned at least partially within the channel and slidably engaged with the sling bar member, a sling hook positioned at an outboard end of the plunger, and a biasing member engaged with the plunger and the sling bar member, where the biasing member biases the plunger in an inboard direction toward the lift engagement member.

A seventy-fourth aspect A74 includes the sling bar assembly of aspect A73, further comprising a sling bar stopper positioned at an outboard end of the sling bar member, where the plunger extends through an inner aperture of the sling bar stopper.

A seventy-fifth aspect A75 includes the sling bar assembly of aspect A74, further comprising a plunger stopper positioned at an end of the plunger opposite the sling hook, where an outer perimeter of the plunger stopper is greater than an inner perimeter of the inner aperture of the sling bar stopper, such that the plunger stopper retains the plunger within the channel of the sling bar member.

A seventy-sixth aspect A76 includes the sling bar assembly of any of aspects A73-A75, where the channel extends outward in the lateral direction and downward in a vertical direction from the lift engagement member.

A seventy-seventh aspect A77 includes a subject support lift comprising a lift actuator, a sling bar assembly selectively coupled to and removable from the lift actuator, the sling bar assembly comprising a lift engagement member for selectively coupling to the lift actuator, a sling bar member extending in a lateral direction, where the sling bar member defines a channel extending in the lateral direction, a plunger positioned at least partially within the channel and slidably engaged with the sling bar member, a sling hook positioned at an outboard end of the plunger, and a biasing member engaged with the plunger and the sling bar member, where the biasing member biases the plunger in an inboard direction toward the lift engagement member.

A seventy-eighth aspect A78 includes the subject support lift of aspect A77, further comprising a sling bar stopper positioned at an outboard end of the sling bar member, where the plunger extends through an inner aperture of the sling bar stopper.

A seventy-ninth aspect A79 includes the subject support lift of aspect A78, further comprising a plunger stopper positioned at an end of the plunger opposite the sling hook, where an outer perimeter of the plunger stopper is greater than an inner perimeter of the inner aperture of the sling bar stopper, such that the plunger stopper retains the plunger within the channel of the sling bar member.

An eightieth aspect A80 includes the subject support lift of any of aspects A77-A79, where the channel extends outward in the lateral direction and downward in a vertical direction from the lift engagement member.

Additional features of the sling bar assemblies and methods for operating the sling bar assemblies described herein will be set forth in the detailed description which follows, and in part will be readily apparent to those skilled in the art from that description or recognized by practicing the embodiments described herein, including the detailed description, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
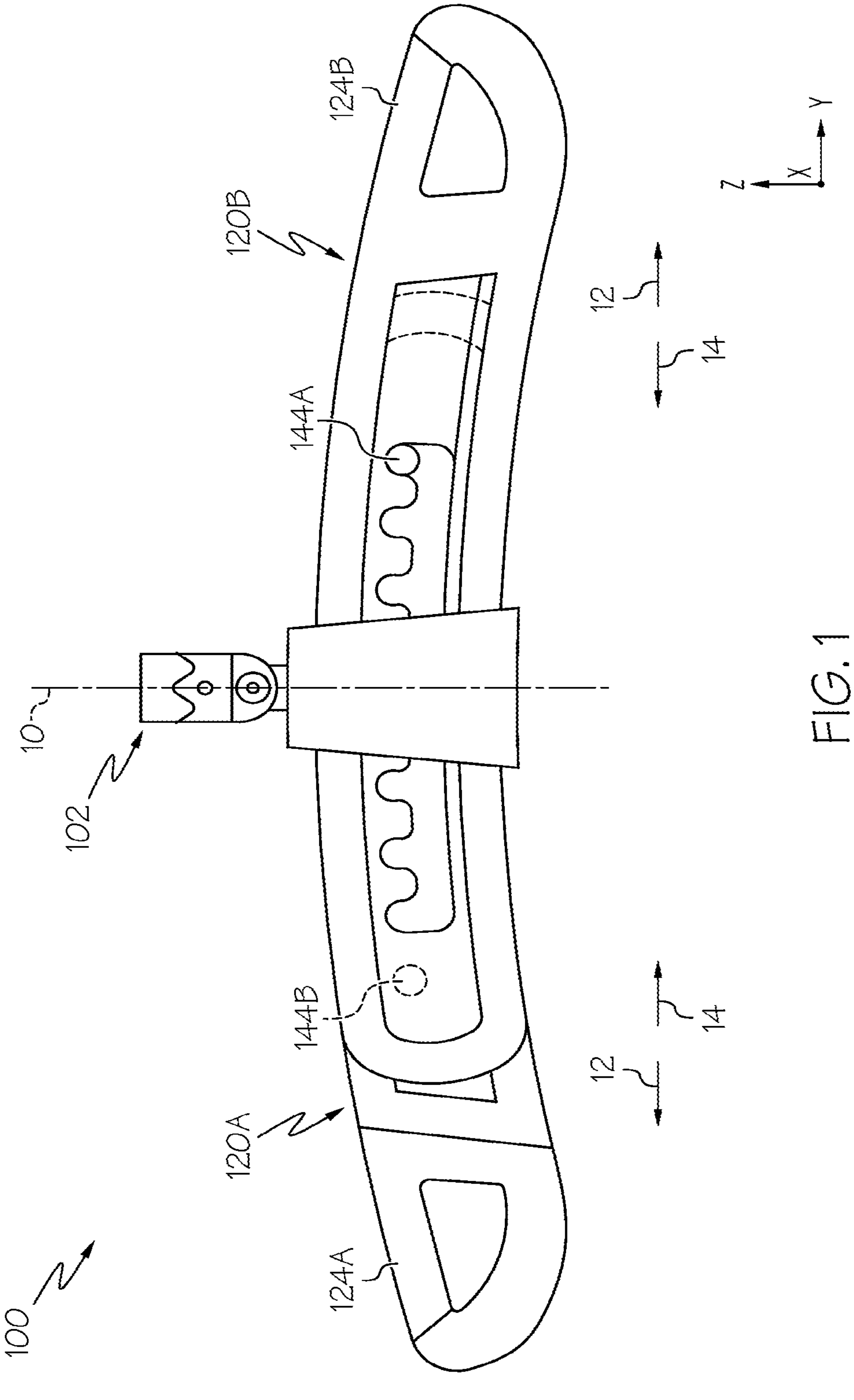
FIG. 1 schematically depicts a front view of a sling bar assembly, according to one or more embodiments shown and described herein.

Reference will now be made in detail to embodiments of sling bar assemblies for subject lifting devices and methods of operating the same, examples of which are illustrated in the accompanying drawings. Whenever possible, the same reference numerals will be used throughout the drawings to refer to the same or like parts.

Sling bar assemblies may be utilized to transport subjects between locations and to assist subjects in transitioning between positions, such as between a sitting position and a standing position. The sling bar assemblies are generally coupled to a lifting device, and an accessory, such as a sling connected to the subject can be selectively coupled to the sling bar assemblies. Subject sizes vary, and smaller sling bars may be utilized with smaller subjects using narrower accessories, and may not generally be suitable for use with larger subjects. Similarly, larger sling bars may be utilized with larger subjects using larger accessories, and may not generally be suitable for use with smaller subjects. As such, conventional sling bars may only be utilized with certain subjects and/or with certain accessories, requiring care givers to correlate appropriate sling bars with appropriate subjects/accessories, and requiring that care facilities stock and maintain multiple varieties of sling bars.

Embodiments described herein are directed to sling bar assemblies that include variable span in a lateral direction. In some embodiments described herein, sling bar assemblies generally include opposing sling bar members slidably engaged with a lift engagement member. Because the sling bar members are movable with respect to one another in the lateral direction, the span of the sling bar assembly may be adjusted to accommodate different sized accessories. By accommodating different sized accessories, sling bar assemblies described herein may reduce the need for care facilities to stock and maintain different sized sling bars and for caregivers to correlate appropriate sling bar assemblies with appropriate accessories.

In some embodiments described herein, the sling bar members are selectively engaged with one another and are repositionable between a locked position, in which movement of the sling bar members with respect to one another is restricted in the lateral direction, and an unlocked position, in which the sling bar members are movable with respect to one another in the lateral direction. By selectively locking the sling bar members with respect to one another, a user may change the width of the sling bar assembly to accommodate different sized accessories.

In some embodiments, sling bar assemblies described herein include sling bar members with sling hooks engaged with biasing members. The biasing members allow the width of the sling bar assembly to expand upon the application of force to the sling bar assembly, such that the width of the sling bar increases as the size of a subject connected to the sling bar assembly increases.

In some embodiments, sling bar assemblies include multiple pairs of sling hooks positioned at different widths on the sling bar assembly. Sensors and/or indicators may be associated with different pairs of sling hooks to assist a user in positioning a sling in appropriate sling hooks for a particular subject.

Various embodiments of sling bar assemblies for subject lifting devices and methods for operating the same will be described herein with specific reference to the appended drawings.

As used herein, the term "longitudinal direction" refers to the forward-rearward direction of the sling bar assembly (i.e., in the +/−X-direction as depicted). The term "lateral direction" refers to the cross-direction of the sling bar assembly (i.e., in the +/−Y-direction as depicted), and is transverse to the longitudinal direction. The term "vertical direction" refers to the upward-downward direction of the sling bar assembly (i.e., in the +/−Z-direction as depicted), and is transverse to the lateral and the longitudinal directions. The term "inboard" refers to the relative positioning of components of the sling bar assembly in direction 14 with respect to a centerline 10 that bisects the sling bar assembly in the lateral direction. As used herein, the term "outboard" refers to the relative positioning of components of the sling bar assembly in direction 12 with respect to the centerline 10.

Referring initially to FIG. 1, a front view of a sling bar assembly 100 is schematically depicted. The sling bar assembly 100 generally includes opposing sling bar members 120A and 120B that are slideably engaged with a lift engagement member 102. As referred to herein the sling bar member 120A is described as a "first sling bar member" and the sling bar member 120B is described as a "second sling bar member." In embodiments, the lift engagement member 102 selectively couples the first and second sling bar members 120A, 120B to a subject support lift, as described in greater detail herein. The first sling bar member 120A includes a first sling hook 124A positioned at an outboard end of the first sling bar member 120A, and the second sling bar member 120B includes a second sling hook 124B positioned at an outboard end of the second sling bar member 120B. The first and second sling hooks 124A, 124B may selectively couple an accessory, such as a sling, a vest, or the like, to the sling bar assembly 100, such that a subject may be selectively coupled a subject support lift through the accessory and the sling bar assembly 100.

Figure 2A:
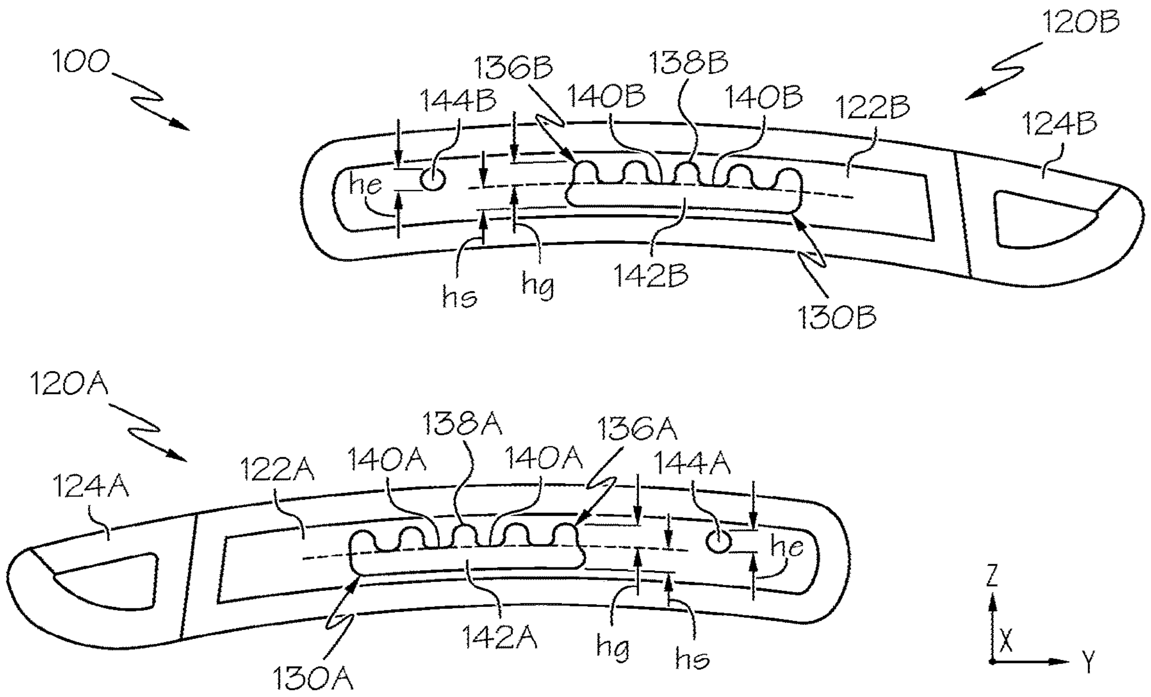
FIG. 2A schematically depicts a front exploded view of the sling bar assembly of FIG. 1, according to one or more embodiments shown and described herein.
Figure 2B:
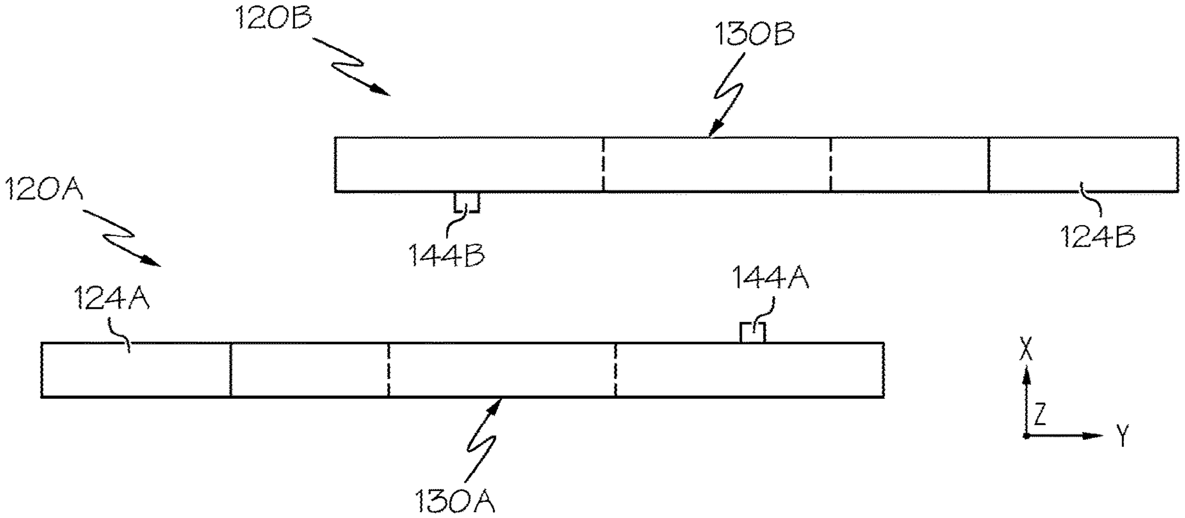
FIG. 2B schematically depicts a top exploded view of the sling bar assembly of FIG. 1, according to one or more embodiments shown and described herein.

Referring collectively to FIGS. 2A, and 2B, a side exploded view and a top exploded view of the sling bar assembly 100 are schematically depicted, respectively. In embodiments, the first sling bar member 120A and the second sling bar member 120B may be substantially the same, and the first sling bar member 120A generally includes a first bar body 122A and the first sling hook 124A. Similarly, the second sling bar member 120B generally includes a second bar body 122B and the second sling hook 124B. In some embodiments, the first and second sling hooks 124A, 124B are coupled to the first and second bar bodies 122A, 122B, respectively. In other embodiments, the first and second sling hooks 124A, 124B are monolithic with the first and second bar bodies 122A, 122B, respectively.

In embodiments, the first bar body 122A generally defines a first plurality of slots 136A extending in the lateral direction along the first bar body 122A. Similarly, in embodiments, the second bar body 122B defines a second plurality of slots 136B extending in the lateral direction along the second bar body 122B. The first and the second plurality of slots 136A and 136B are generally oriented to face downward in the vertical direction and include crests 140A, 140B, respectively, extending downward in the vertical direction. The first plurality of slots 136A further includes individual slots 138A positioned between adjacent crests 140A, and the second plurality of slots 136B further includes individual slots 138B positioned between adjacent crests 140B.

The first bar body 122A includes a first engagement member 144A extending outward from the first bar body 122A, and the second bar body 122B includes a second engagement member 144B extending outward from the second bar body 122B. In embodiments, when the sling bar assembly 100 is assembled, the first engagement member 144A extends outward from the first bar body 122A in the longitudinal direction toward the second bar body 122B, while the second engagement member 144B extends outward from the second bar body 122B in the longitudinal direction toward to the first bar body 122A.

The first and second engagement members 144A, 144B, in embodiments, have complementary shapes with the first and the second plurality of slots 136A, 136B. For example, in the embodiment depicted in FIGS. 2A and 2B, the first and second engagement members 144A, 144B each include generally cylindrical shapes, while the first and second plurality of slots 136A, 136B each include generally serpentine shape. More particularly, the first engagement member 144A includes a cylindrical shape that is generally shaped and sized to fit at least partially within an individual slot 138B between adjacent crests 140B of the second sling bar member 120B. The second engagement member 144B also includes a cylindrical shape that is generally shaped and sized to fit at least partially within an individual slot 138A between adjacent crests 140A of the first sling bar member 120A. While the embodiment depicted in FIGS. 2A and 2B shows the first and second engagement members 144A, 144B having cylindrical shapes and the first and second plurality of slots 136A, 136B as having serpentine shapes, the first and second engagement members 144A, 144B and the first and second plurality of slots 136A, 136B may include any suitable complementary shapes that cooperate to selectively restrict lateral movement of the first bar body 122A and the second bar body 122B with respect to one another. For example, in other embodiments, the first and second engagement members 144A, 144B may form rectangular prisms or the like, while the first and second plurality of slots 136A, 136B may each include a rectangular wave shape or the like.

With the first engagement member 144A of the first sling bar member 120A positioned within an individual slot 138B, and with the second engagement member 144B of the second sling bar member 120B positioned within an individual slot 138A, movement of the first sling bar member 120A and the second sling bar member 120B with respect to one another in the lateral direction is restricted. In particular, with the first engagement member 144A positioned at least partially within an individual slot 138B of the second sling bar member 120B, engagement between adjacent crests 140B and the first engagement member 144A restricts lateral movement of the first sling bar member 120A with respect to the second sling bar member 120B. For example, in embodiments, the first engagement member 144A is rigidly coupled to or monolithic with the first bar body 122A, such that restriction of movement of the first engagement member 144A with respect to the second sling bar member 120B restricts movement of first bar body 122A with respect to the second sling bar member 120B in the lateral direction.

Similarly, with the second engagement member 144B positioned at least partially within an individual slot 138A of the first sling bar member 120A, engagement between adjacent crests 140A and the second engagement member 144B restricts lateral movement of the second sling bar member 120B with respect to the first sling bar member 120A. For example, in embodiments, the second engagement member 144B is rigidly coupled to or may be monolithic with the second bar body 122B of the second sling bar member 120B, such that restriction of movement of the second engagement member 144B with respect to the first sling bar member 120A restricts movement of second bar body 122B with respect to the first sling bar member 120A in the lateral direction.

In embodiments, the first bar body 122A defines a first cavity 130A extending inward into the first sling bar member 120A in the longitudinal direction. Similarly, the second bar body 122B defines a second cavity 130B extending inward into the second sling bar member 120B in the longitudinal direction. In embodiments, the first cavity 130A defines the first plurality of slots 136A and a first guide portion 142A positioned below the first plurality of slots 136A. Similarly, the second cavity 130B defines the second plurality of slots 136B and a second guide portion 142B positioned below the second plurality of slots 136B in the vertical direction. In some embodiments, the first and second cavities 130A, 130B may extend through the first sling bar member 120A and the second sling bar member 120B, respectively, in the longitudinal direction. In other embodiments, the first and second cavities 130A, 130B may extend only partially into the first sling bar member 120A and the second sling bar member 120B, respectively, in the longitudinal direction.

In embodiments, the first and second guide portions 142A, 142B each define a height hg evaluated in the vertical direction, and the first and the second plurality of slots 136A, 136B each define a height hs evaluated in the vertical direction between the individual slots 138A, 138B and the crests 140A, 140B, respectively. The first and second engagement members 144A, 144B, in embodiments, each define a height he evaluated in the vertical direction, and the height hg of the first and second guide portions 142A, 142B is greater than the height he of the first and second engagement members 144A, 144B. As such, when the first and second engagement members 144A, 144B are positioned within the second and first guide portions 142B, 142A, respectively, the first and second engagement members 144A, 144B may move in the lateral direction within the second and first guide portions 142B, 142A. In embodiments, the height hs of the first and second plurality of slots 136A, 136B corresponds to the height he of the first and second engagement members 144A, 144B, such that when the first and second engagement members 144A, 144B are positioned at least partially within the second and first plurality of slots 136B, 136A, respectively, the first and second engagement members 144A, 144B are retained within the second and first plurality of slots 136B, 136A.

In embodiments, the first engagement member 144A is repositionable between the second plurality of slots 136B and the second guide portion 142B of the second sling bar member 120B. Likewise, the second engagement member 144B is repositionable between the first plurality of slots 136A and the first guide portion 142A of the first sling bar member 120A. By repositioning the first and second engagement members 144A, 144B between the second and first plurality of slots 136B, 136A and the second and first guide portions 142B, 142A, the first and second sling bar members 120A, 120B may be repositioned between a locked position and an unlocked position, as described in greater detail herein.

While in the embodiment depicted FIGS. 2A and 2B each of the first and second sling bar members 120A, 120B include the first and second engagement members 144A, 144B and the first and second plurality of slots 136A, 136B, respectively, it should be understood that in some embodiments, one of the first and second sling bar members 120A, 120B may include only an engagement member without including a plurality of slots, while the other of the first and second sling bar members 120A, 120B only includes the plurality of slots without including an engagement member.

Figure 3:
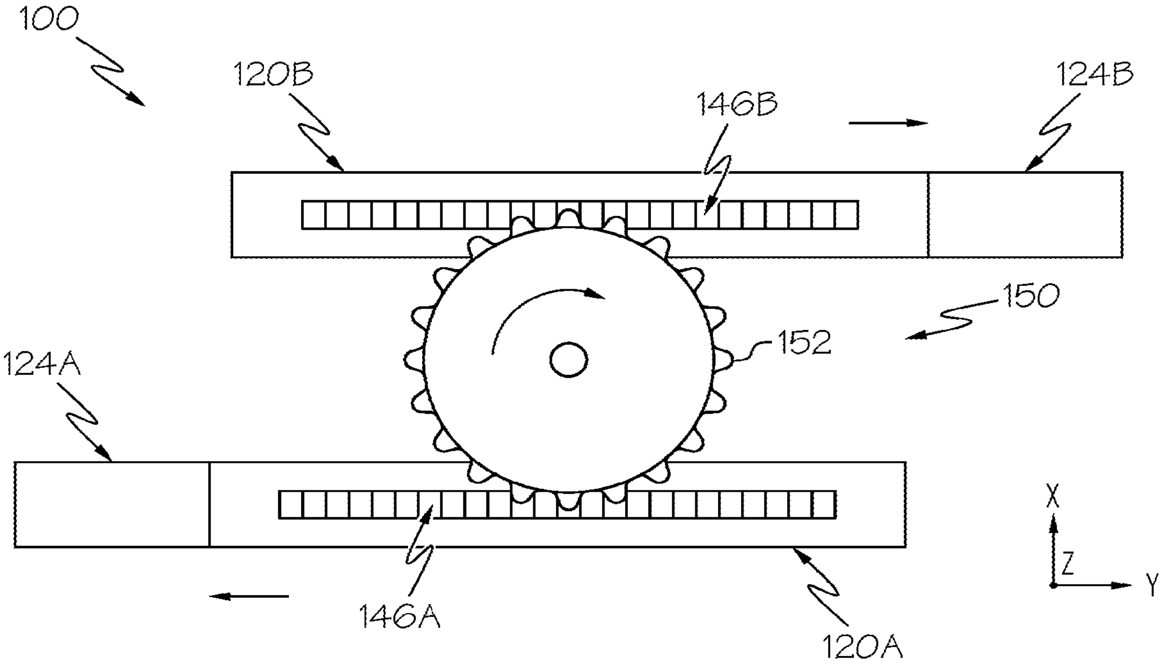
FIG. 3 schematically depicts a top view of the sling bar assembly of FIG. 1, according to one or more embodiments shown and described herein.

Referring to FIG. 3, in some embodiments, the sling bar assembly 100 includes a lateral governor 150 engaged with and positioned between the first and second sling bar members 120A and 120B. The lateral governor 150 may be coupled to the lift engagement member 102 (FIG. 1). In the embodiment depicted in FIG. 3, the lateral governor 150 generally includes a pinion including a plurality of teeth 152 extending around a circumference of the lateral governor 150. The lateral governor 150 is rotatable, and in some embodiments, the lateral governor 150 is coupled to a motor or the like that induces the lateral governor 150 to rotate. In some embodiments, the lateral governor 150 is not powered, and instead rotates as a result of movement of the first and second sling bar members 120A, 120B in the lateral direction.

The first and second sling bar members 120A, 120B may include racks 146A and 146B, respectively, which are engaged with the lateral governor 150. In particular, the plurality of teeth 152 is engaged with the racks 146A, 146B, such that as the lateral governor 150 rotates, the rotation of the lateral governor 150 causes the first and second sling bar members 120A, 120B to move in opposite directions in the lateral direction. Similarly, as the first sling bar member 120A and the second sling bar member 120B move with respect to one another in the lateral direction, engagement between the racks 146A, 146B and the plurality of teeth 152 cause the lateral governor 150 to rotate.

The lateral governor 150 generally permits movement of the first sling bar member 120A and the second sling bar member 120B in opposite directions in the lateral direction, while restricting movement of the first sling bar member 120A and the second sling bar member 120B in the same direction in the lateral direction. For example, a user may selectively move the first sling bar member 120A in the lateral direction (e.g., in the −Y-direction as depicted) with respect to the second sling bar member 120B. Engagement between the rack 146A of the first sling bar member 120A and the lateral governor 150 causes the lateral governor 150 to rotate (e.g., in the clockwise direction as depicted) as the first sling bar member 120A moves in the −Y-direction as depicted. As the lateral governor 150 rotates, engagement between the lateral governor 150 and the rack 146B of the second sling bar member 120B causes the second sling bar member 120B to move in the +Y-direction as depicted.

Similarly, engagement between the rack 146A of the first sling bar member 120A and the lateral governor 150 causes the lateral governor 150 to rotate (e.g., in the counter-clockwise direction as depicted) as the first sling bar member 120A moves in the +Y-direction as depicted. As the lateral governor 150 rotates in the counter-clockwise direction, engagement between the lateral governor 150 and the rack 146B of the second sling bar member 120B causes the second sling bar member 120B to move in the −Y-direction as depicted. Accordingly, movement of either of the first or second sling bar member 120A, 120B in the lateral direction generally causes the lateral governor 150 to rotate, thereby causing the other of the first or second sling bar member 120A, 120B to move in an opposite direction in the lateral direction. In this way, the lateral governor 150 generally restricts movement of the first and second sling bar members 120A, 120B in the same direction in the lateral direction (e.g., both moving in the +Y-direction or both moving in the −Y-direction as depicted), while allowing the first and second sling bar members 120A, 120B to move in opposite directions in the lateral direction (e.g., with one moving in the +Y-direction and the other moving in the −Y-direction as depicted).

In general it is desirable for the first sling hook 124A and the second sling hook 124B to be spaced apart from the lift engagement member 102 (FIG. 1) by the same distance such that a subject coupled to the sling bar assembly 100 through the first and second sling hook 124A, 124B is generally centered below the lift engagement member 102. Accordingly, by restricting movement of the first and second sling bar members 120A in the same direction in the lateral direction, the lateral governor 150 assists in ensuring that the first and second sling hook 124A, 124B are spaced apart from the lift engagement member 102 (FIG. 1) by the same distance in the lateral direction.

In some embodiments, the lateral governor 150 may allow some rotation of the first sling bar member 120A and/or the second sling bar member 120B about the X-axis, as depicted, so as to allow the first and second sling bar members 120A, 120B to be repositioned between a locked position and an unlocked position, as described in greater detail herein. For example, in some embodiments, teeth of the plurality of teeth 152 may be generally smaller than teeth of the racks 146A, 146B, such that the first and second sling bar members 120A, 120B may rotate about the X-axis with respect to the lateral governor 150. In some embodiments, the lateral governor 150 may include a conical or frustroconical shape that permits rotation of the first sling bar member 120A and/or the second sling bar member 120B about the X-axis with respect to the lateral governor 150.

Furthermore, while in the embodiment depicted in FIG. 3, the racks 146A, 146B are depicted as being on a top surface of the first and second sling bar members 120A, 120B, in other embodiments, the racks 146A, 146B may be on other surfaces of the first and second sling bar members 120A, 120B, such as a lateral surface or a bottom surface of the first and second sling bar members 120A, 120B.

Figure 4A:
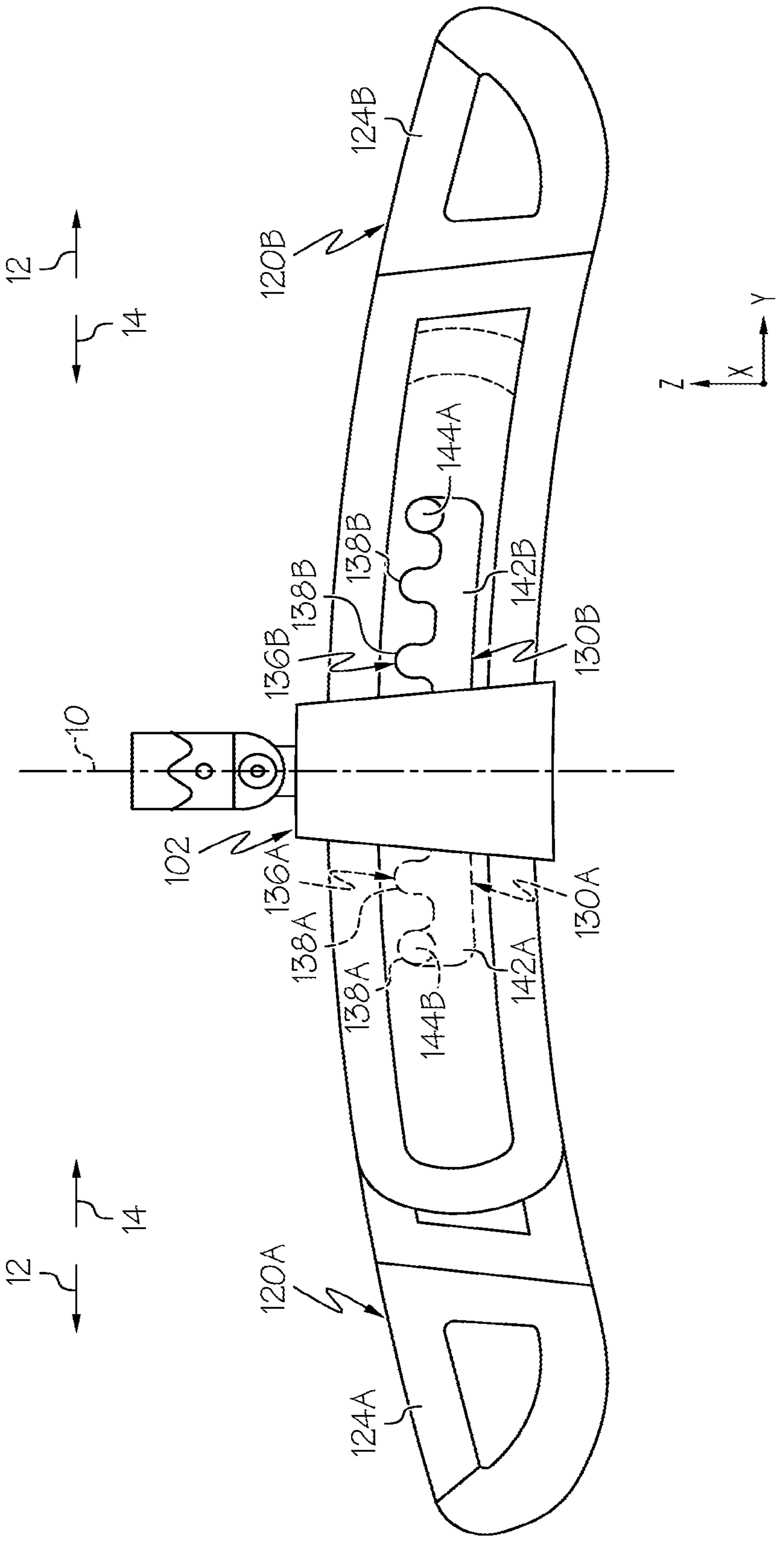
FIG. 4A schematically depicts a side view of the sling bar assembly of FIG. 1 in a retracted and locked position, according to one or more embodiments shown and described herein.
Figure 4B:
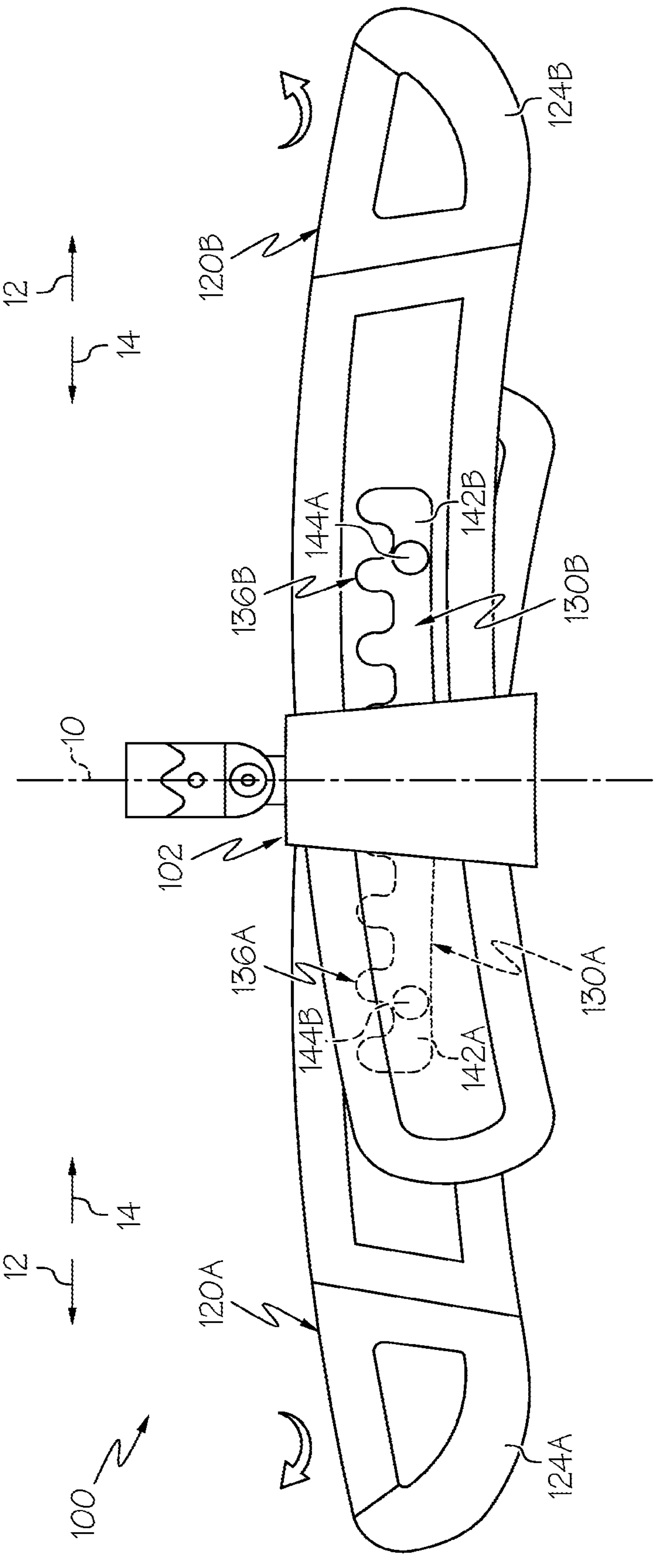
FIG. 4B schematically depicts a side view of the sling bar assembly of FIG. 1 in an unlocked position, according to one or more embodiments shown and described herein.
Figure 4C:
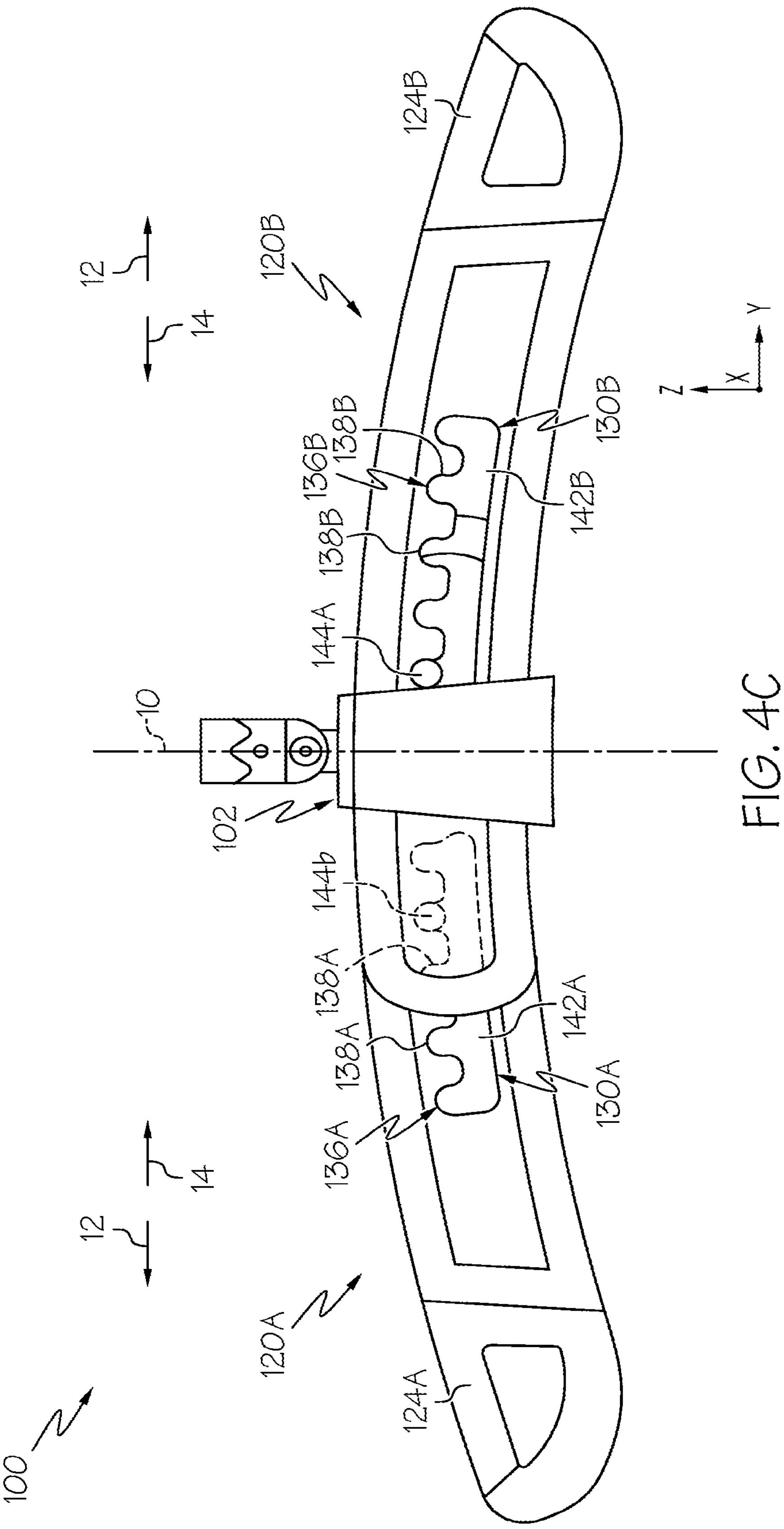
FIG. 4C schematically depicts a side view of the sling bar assembly of FIG. 1 in an expanded and locked position, according to one or more embodiments shown and described herein.

Referring to FIGS. 4A-4C, a front view of the sling bar assembly 100 being repositioned between a locked position and an unlocked position to expand the sling bar assembly 100 in the lateral direction. More particularly, by repositioning the first and second engagement members 144A, 144B between different slots 136B and 136A, respectively, a distance evaluated between the first sling hook 124A and the second sling hook 124B may be selectively adjusted.

For example and referring to FIG. 4A, the sling bar assembly 100 is depicted in a locked position in which the first engagement member 144A of the first sling bar member 120A is positioned within the second plurality of slots 136B of the second sling bar member 120B, and the second engagement member 144B of the second sling bar member 120B is positioned within the first plurality of slots 136A of the first sling bar member 120A.

Referring to FIG. 4B, to reposition the sling bar assembly 100 into an unlocked position, the outboard ends of the first and second sling bar members 120A, 120B are moved upward in the vertical direction (i.e., in the +Z-direction as depicted), rotating the first and second sling bar members 120A, 120B about the X-axis with respect to the lift engagement member 102. As the outboard ends of the first and second sling bar members 120A, 120B move upward in the vertical direction, the first engagement member 144A moves from the second plurality of slots 136B to the second guide portion 142B of the second sling bar member 120B. Likewise, the second engagement member 144B moves from the first plurality of slots 136A to the first guide portion 142A of the first sling bar member 120A. With the first engagement member 144A and the second engagement member 144B positioned within the second guide portion 142B and the first guide portion 142A, respectively, the first sling bar member 120A and the second sling bar member 120B are movable with respect to one another in the lateral direction, such that the first sling hook 124A and the second sling hook 124B may be moved inboard toward, or outboard from the lift engagement member 102.

Referring to FIG. 4C, once the first sling bar member 120A and the second sling bar member 120B are positioned as desired, the first sling bar member 120A and the second sling bar member 120B may be repositioned from the unlocked position into the locked position. More particularly, the first engagement member 144A is repositioned into the second plurality of slots 136B of the second sling bar member 120B. Similarly, the second engagement member 144B is repositioned into the first plurality of slots 136A of the first sling bar member 120A. In the example shown in FIGS. 4A-4C, the first and second sling hooks 124A, 124B of the first and second sling bar members 120A, 120B are moved outboard in the lateral direction (i.e., in direction 12 as depicted) by repositioning the first and second engagement members 144A, 144B between individual slots 138B and 138A respectively. In a similar manner, the first and second sling hooks 124A, 124B of the first and second sling bar members 120A, 120B may be moved inboard in the lateral direction (i.e., in direction 14 as depicted) by repositioning the first and second engagement members 144A, 144B between individual slots 138B and 138A respectively. In this way, a distance between the first and second sling hooks 124A, 124B may be selectively adjusted in the lateral direction.

By adjusting the distance between the first and second sling hooks 124A, 124B in the lateral direction, the lateral span of the sling bar assembly 100 may be adjusted to accommodate different sized subjects and/or different sized accessories. For example, comparatively larger subjects may be wider in the lateral direction, and sling bar assemblies that are too narrow in the lateral direction may cause accessories to pinch or impinge the subject when coupled to a sling bar assembly. By contrast, comparatively smaller subjects may be narrower in the lateral direction, and sling bar assemblies that are too wide in the lateral direction may cause accessories to extend outward from the subject when coupled to a sling bar assembly, which may make the sling bar assembly difficult to manipulate and move between locations when transporting the subject. Because the distance between the first and second sling hooks 124A, 124B may be selectively adjusted, the sling bar assembly 100 may accommodate different sized subjects, thereby reducing the need for care facilities to stock and maintain multiple sizes of sling bar assemblies. In embodiments, the first and second plurality of slots 136A, 136B may include any suitable number and size of slots extending in the lateral direction, allowing for any level of lateral adjustment of the sling bar assembly 100.

Additionally, as noted above, the first and second plurality of slots 136A, 136B are oriented to face downward in the vertical direction. Because the first and second plurality of slots 136A, 136B are oriented to face downward in the vertical direction, the first and second plurality of slots 136A, 136B may be biased into engagement with the first and second engagement members 144A, 144B, for example as a result of gravity. By biasing the first and second plurality of slots 136A, 136B into engagement with the first and second engagement members 144A, 144B, the sling bar assembly 100 is biased into the locked position, such that the first sling bar member 120A and the second sling bar member 120B are generally not movable with respect to one another in the lateral direction unless actively moved into the unlocked position.

Figure 5:
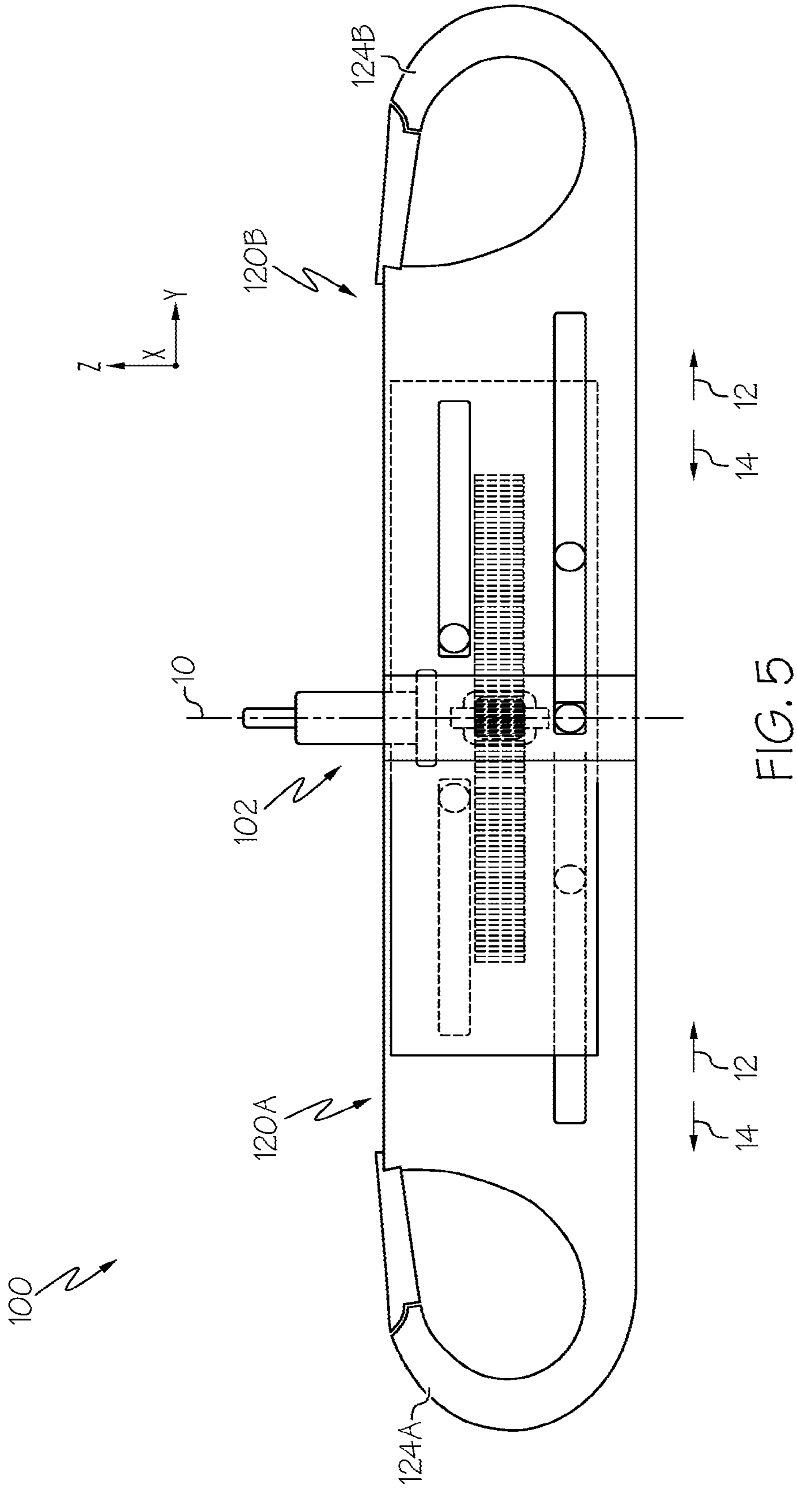
FIG. 5 schematically depicts a side view of another sling bar assembly, according to one or more embodiments shown and described herein.
Figure 6A:
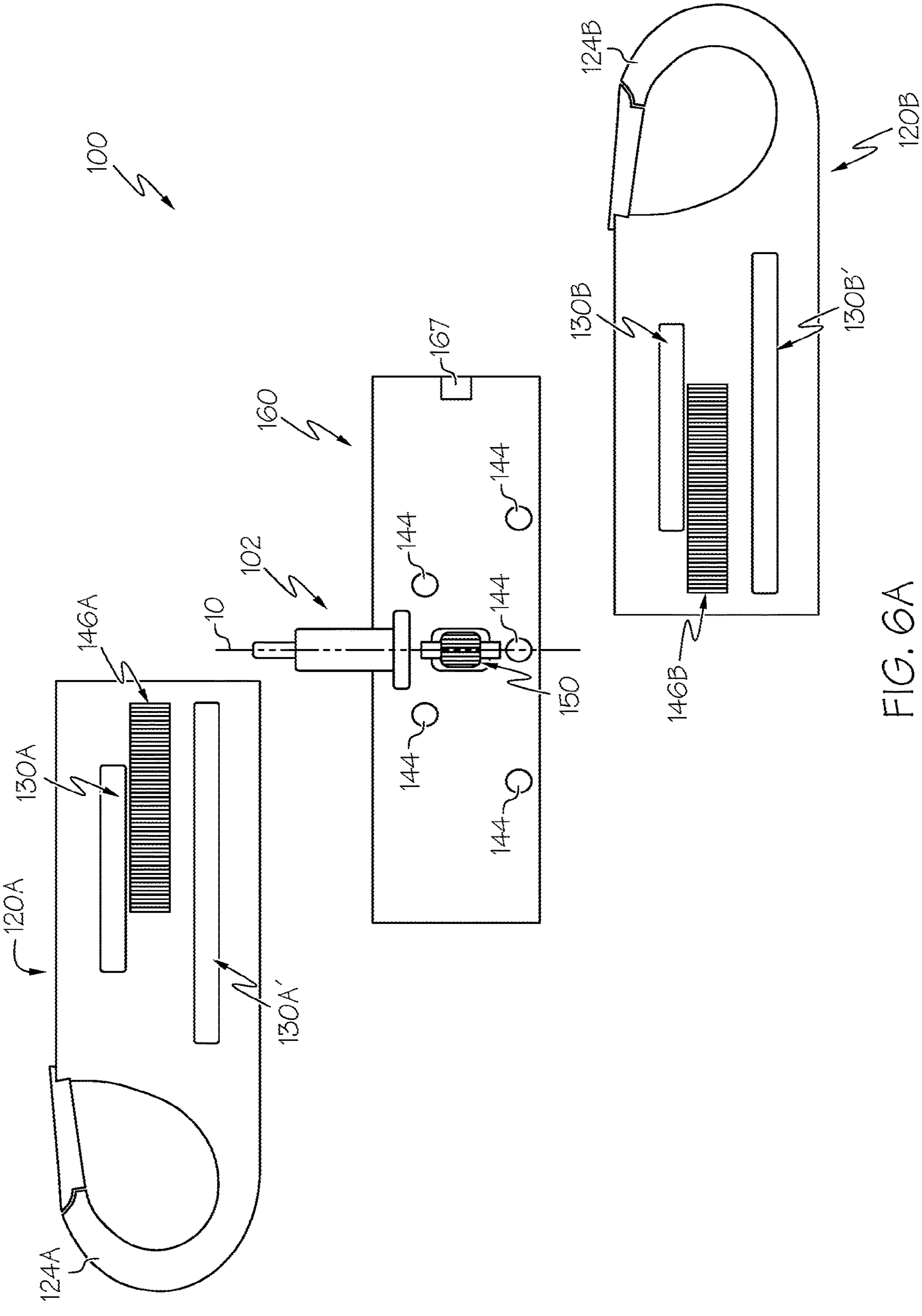
FIG. 6A schematically depicts an exploded view of the sling bar assembly of FIG. 5, according to one or more embodiments shown and described herein.
Figure 6B:
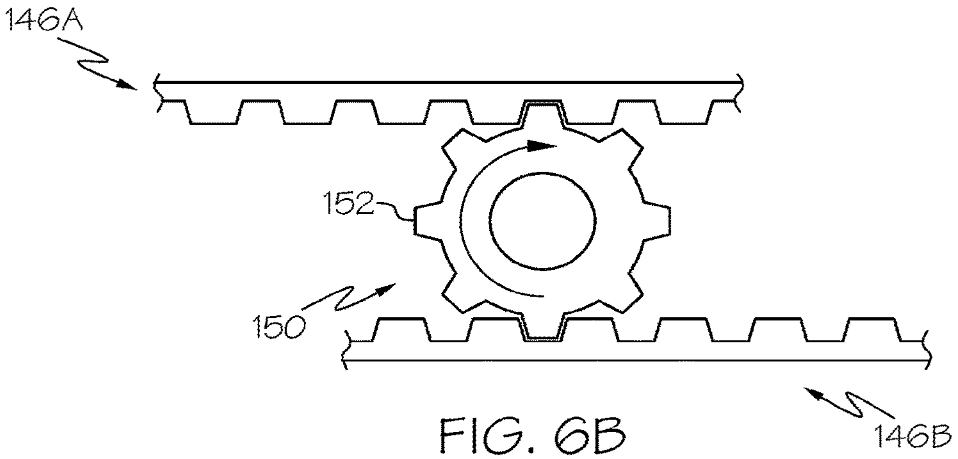
FIG. 6B schematically depicts an enlarged top view of a lateral governor of the sling bar assembly of FIG. 6A, according to one or more embodiments shown and described herein.

Referring to FIGS. 5, 6A, and 6B, another embodiment of the sling bar assembly 100 is schematically depicted. Like the embodiment described above and depicted in FIGS. 1-4C, the sling bar assembly 100 includes the opposing sling bar members 120A, 120B slidably engaged with the lift engagement member 102. Furthermore, like the embodiment described above, the first sling bar member 120A defines the first cavity 130A extending in the lateral direction, and the second sling bar member defines the second cavity 130B extending in the lateral direction. Like the embodiments described above and depicted in FIGS. 1-4C, the first sling bar member 120A includes the first sling hook 124A positioned at the outboard end of the first sling bar member 120A, and the second sling bar member 120B includes the second sling hook 124B positioned at the outboard end of the second sling bar member 120B. The first sling bar member 120A includes the rack 146A, and the second sling bar member 120B includes the rack 146B. However, in the embodiment depicted in FIGS. 5, 6A, and 6B the first and second cavities 130A, 130B do not include the slots 136A, 136B (FIG. 2A), and the first and second cavities 130A, 130B are formed as grooves extending in the lateral direction. and the sling bar assembly 100 includes a sling bar frame 160 positioned between and engaged with the first and second sling bar members 120A, 120B.

In the embodiment depicted in FIGS. 5 and 6A, the sling bar frame 160 is coupled to the lift engagement member 102. In embodiments, the sling bar frame 160 may be coupled to the lift engagement member 102. In some embodiments, the lift engagement member 102 is monolithic with the sling bar frame 160.

In embodiments, the lateral governor 150 is coupled to the sling bar frame 160 and comprises the pinion positioned between and engaged with the racks 146A, 146B of the opposing sling bar members 120A, 120B. Furthermore, in the embodiment depicted in FIGS. 5 and 6A, the sling bar frame 160 includes engagement members 144 extending outward from the sling bar frame 160.

In some embodiments a biasing member 167 is engaged with the sling bar frame 160. The biasing member 167 is also engaged with one or both of the sling bar members 120A, 120B and biases at least one of the sling bar members 120A, 120B inboard toward the lift engagement member 102. In embodiments, the biasing member 167 may include a tension spring, a compression spring, a torsion spring, or the like.

In some embodiments, separate engagement members 144 may be coupled to sling bar frame 160 at different heights. For example, in the embodiment depicted in FIGS. 5 and 6A, two of the engagement members 144 are coupled to the sling bar frame 160 at an upper height, and three of the engagement members 144 are coupled to the sling bar frame 160 at a lower height that is below the upper height. In these embodiments, the cavity 130A of the first sling bar member 120A is an upper cavity 130A, and the first sling bar member 120A further defines a lower cavity 130A' positioned below the upper cavity 130A in the vertical direction. Similarly, the cavity 130B of the second sling bar member 120B is an upper cavity 130B, and the second sling bar member 120B further defines a lower cavity 130B' positioned below the upper cavity 130B in the vertical direction. The engagement members 144 at the upper height may be engaged with the upper cavities 130A, 130B, while the engagement members 144 at the lower height may be engaged with the lower cavities 130A', 130B'. By including upper cavities 130A, 130B and lower cavities 130A', 130B', force applied to the engagement members 144 through the first and second sling bar members 120A, 120B may be distributed, as compared to sling bar members including a single cavity.

Figure 7A:
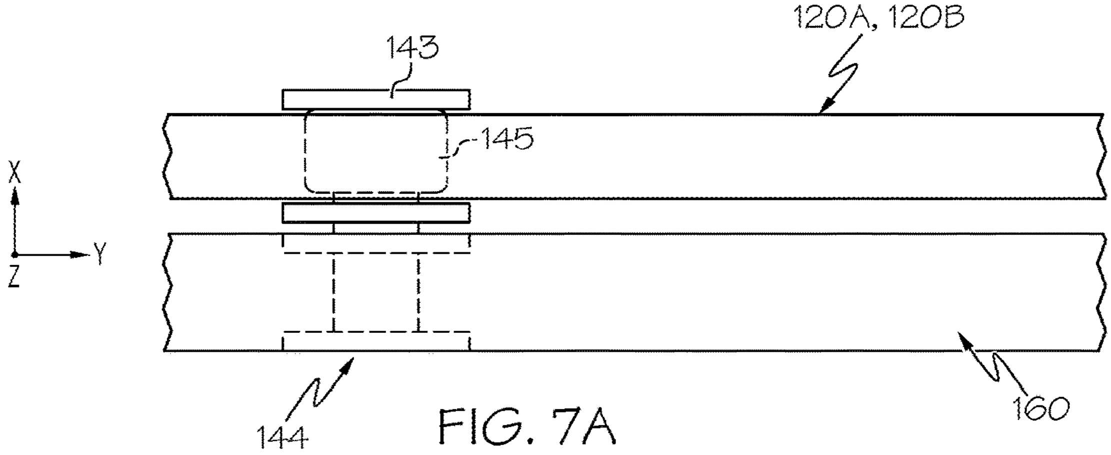
FIG. 7A schematically depicts an enlarged top view of the sling bar assembly of FIG. 5, according to one or more embodiments shown and described herein.
Figure 7B:
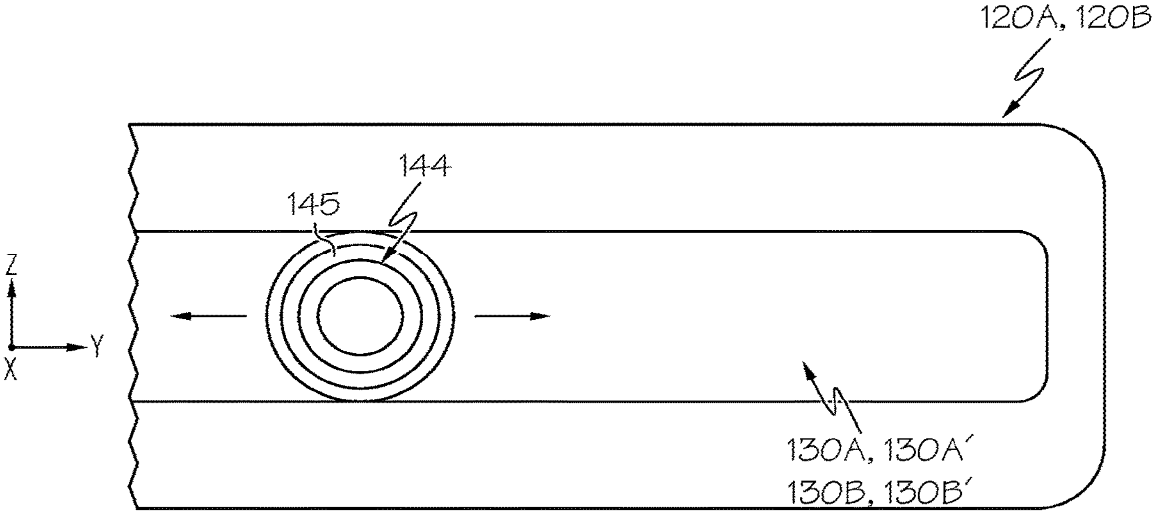
FIG. 7B schematically depicts an enlarged side view of the sling bar assembly of FIG. 7A, according to one or more embodiments shown and described herein.

Referring to FIGS. 7A and 7B, an enlarged top view and side view of the engagement of an engagement member 144 with the first sling bar member 120A are schematically depicted, respectively. While reference is made herein to the first sling bar member 120A, it should be understood that engagement members 144 may be similarly engaged with the second sling bar member 120B. Similarly, while reference is made herein to the upper cavity 130A, it should be understood that engagement members 144 may be similarly engaged with the lower cavity 130A' and the upper and lower cavities 130B, 130B'. Furthermore, while a single engagement member 144 is depicted in FIGS. 7A and 7B, it should be understood that each of the engagement members 144 may operate in the same manner.

In some embodiments, the engagement members 144 include rollers 145 positioned within the upper cavity 130A, and include a flange 143 that retains the roller 145 on the engagement member 144. The roller 145 is operable to rotate and can include one or more bearings that allow the roller 145 to rotate. In embodiments, the position of the engagement members 144 are generally fixed on the sling bar frame 160, and through engagement between the engagement members 144 and the first and second sling bar members 120A, 120B are movable with respect to the engagement members 144 and the sling bar frame 160 in the lateral direction.

Figure 8:
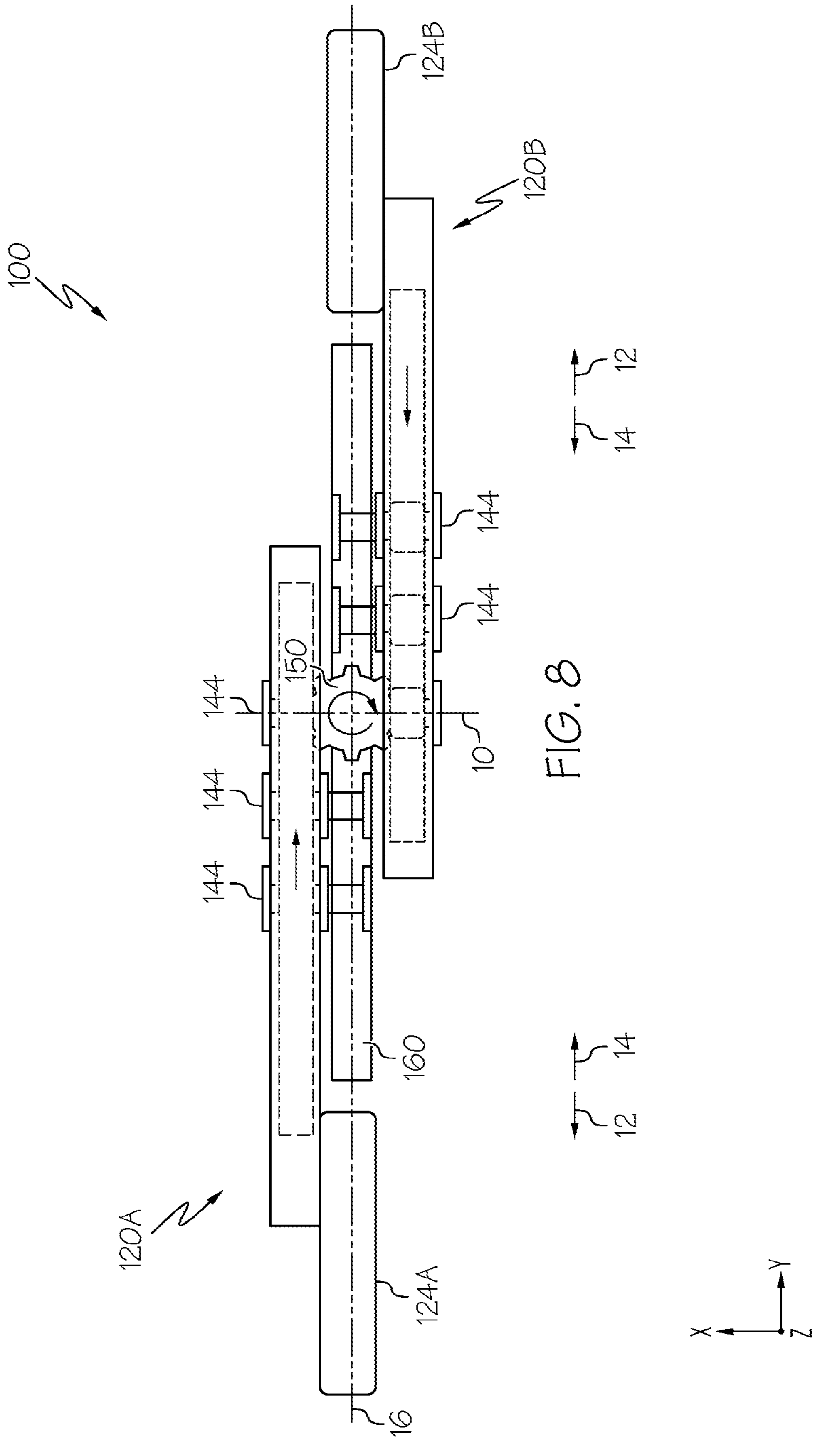
FIG. 8 schematically depicts a top view of the sling bar assembly of FIG. 5, according to one or more embodiments shown and described herein.

Referring to FIG. 8, a top view of the sling bar assembly 100 including the sling bar frame 160 is schematically depicted. As depicted in FIG. 8, in some embodiments, ones of the engagement members 144 are engaged with the first sling bar member 120A, and other of the engagement members 144 are engaged with the second sling bar member 120B. However, it should be understood that in some embodiments one or all of the engagement members 144 may be simultaneously engaged with both the first sling bar member 120A and the second sling bar member 120B.

In the embodiment depicted in FIG. 8, the first sling hook 124A is offset from the first sling bar member 120A in the longitudinal direction and the second sling hook 124B is offset from the second sling bar member 120B in the longitudinal direction. As shown in FIG. 8, the first sling bar member 120A and the second sling bar member 120B are spaced apart from one another in the longitudinal direction to allow the first sling bar member 120A and the second sling bar member 120B to move with respect to one another and the sling bar frame 160 in the lateral direction. By offsetting the first sling hook 124A and the second sling hook 124B from the first sling bar member 120A and the second sling bar member 120B, respectively, the first sling hook 124A and the second sling hook 124B may be aligned with a centerline 16 bisecting the sling bar assembly 100 in the longitudinal direction. By aligning the first sling hook 124A and the second sling hook 124B with the centerline 16, force applied to the sling bar assembly 100, such as may be applied by a subject positioned in a sling coupled to the sling bar assembly 100, may be evenly distributed, thereby reducing the tendency of the sling bar assembly 100 to rotate about the vertical direction.

Figure 9A:
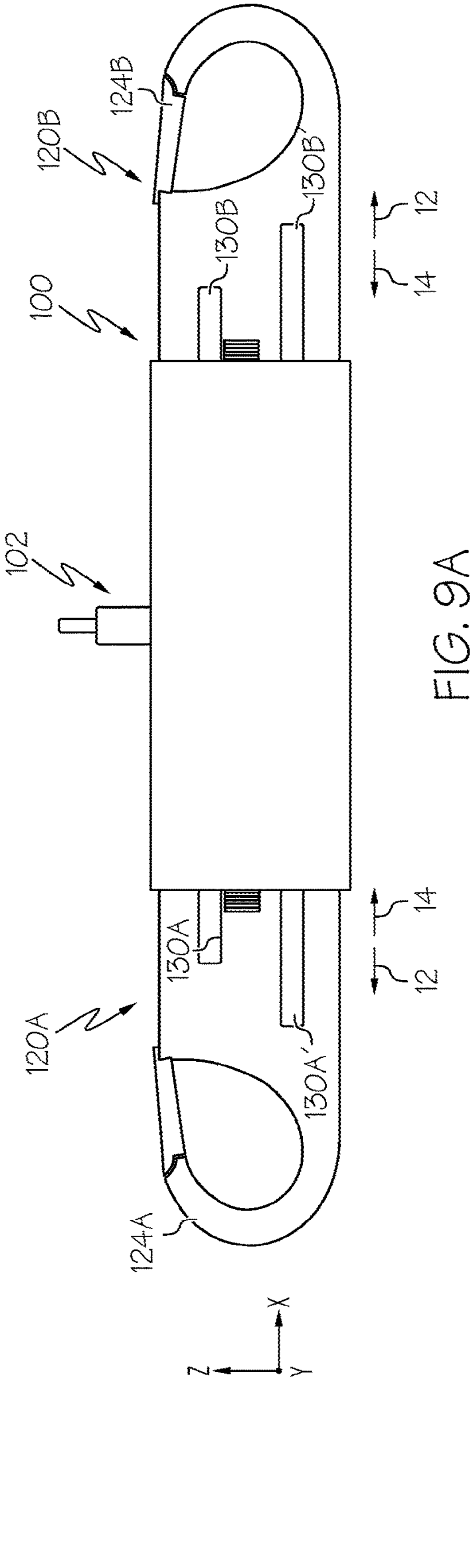
FIG. 9A schematically depicts the sling bar assembly of FIG. 5 in an expanded position, according to one or more embodiments shown and described herein.
Figure 9B:
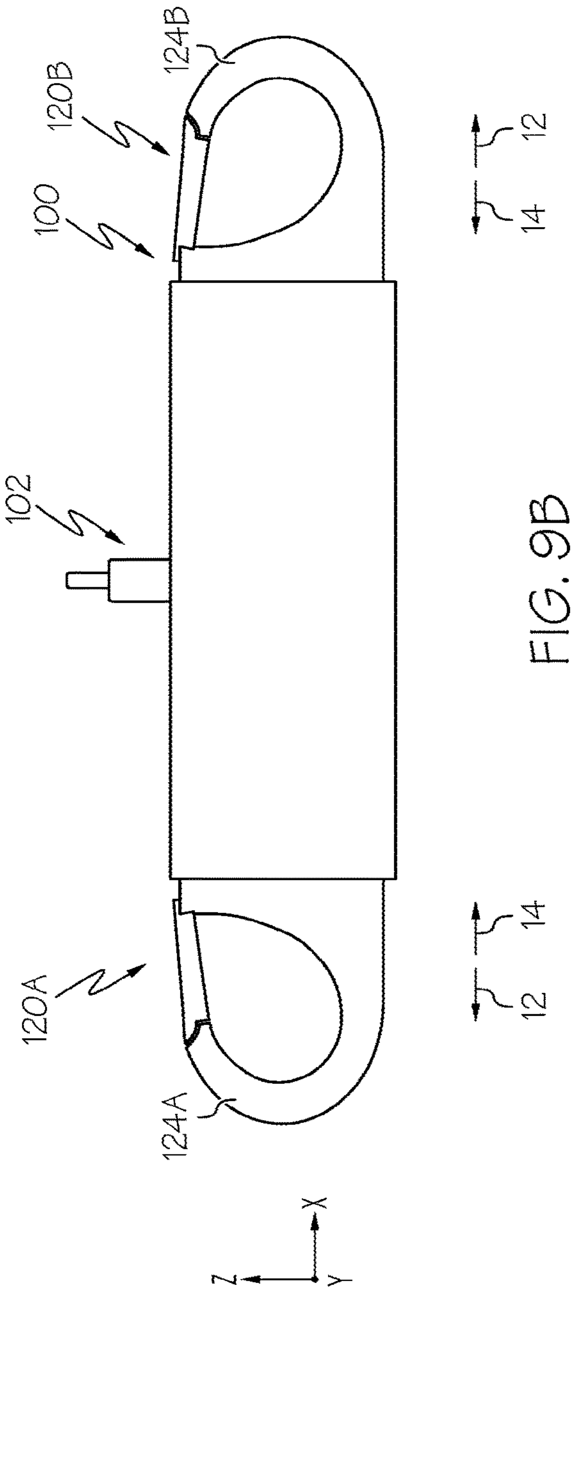
FIG. 9B schematically depicts the sling bar assembly of FIG. 5 in a retracted position, according to one or more embodiments shown and described herein.

Referring to FIGS. 9A and 9B, a side view of the sling bar assembly 100 in an expanded position and a retracted position are schematically depicted, respectively. Similar to the embodiment described above and depicted in FIGS. 3-4C, the first and second sling bar members 120A, 120B are movable with respect to one another in the lateral direction. In particular, the first and second sling bar members 120A, 120B can be moved inboard (i.e., in direction 14) toward the lift engagement member 102 and outboard (i.e., in direction 12) away from the lift engagement member 102. Similar to the embodiment described above and depicted in FIGS. 3-4C, the lateral governor 150 (FIG. 6B) generally permits movement of the first sling bar member 120A and the second sling bar member 120B in opposite directions in the lateral direction, while restricting movement of the first sling bar member 120A and the second sling bar member 120B in the same direction in the lateral direction. In this way, the first and second sling hooks 124A, 124B are generally maintained at the same distance from the lift engagement member 102 in the lateral direction.

However, in the embodiment depicted in FIGS. 9A and 9B, instead of being locked at discrete positions in the lateral direction (e.g., via engagement of the engagement members 144 with the slots 136A, 136B as shown in FIGS. 4A-4C), the first sling bar member 120A and the second sling bar member 120B are freely movable in the lateral direction. As larger subjects are coupled to the sling bar assembly 100 (e.g., via a sling attached to the sling hooks 124A, 124B), the size of the subject may apply force to the sling bar assembly 100 inducing the first and second sling bar members 124A, 124B to move outboard (i.e., in direction 12 as depicted). By contrast, as smaller subjects are coupled to the sling bar assembly 100 100 (e.g., via a sling attached to the sling hooks 124A, 124B), the size of the subject may apply force to the sling bar assembly 100 inducing the first and second sling bar members 124A, 124B to move inboard (i.e., in direction 14 as depicted). In this way, the first and second sling bar members 124A, 124B may freely move in the lateral direction to be appropriately positioned for different sized subjects.

Moreover, forces associated with the subject's weight may be directed through the sling bar assembly 100 to the lift engagement member 102 (and accordingly the lift device) through the engagement of the engagement members 144 (FIG. 8) and the cavities 130A, 130A', 130B, 130B'. As such, forces applied to the lateral governor 150 (FIG. 8) as a result of the subject's weight may be minimized, thereby allowing the lateral governor 150 to rotate freely thereby allowing the first and second sling bar members 124A, 124B to move in the lateral direction.

Figure 10:
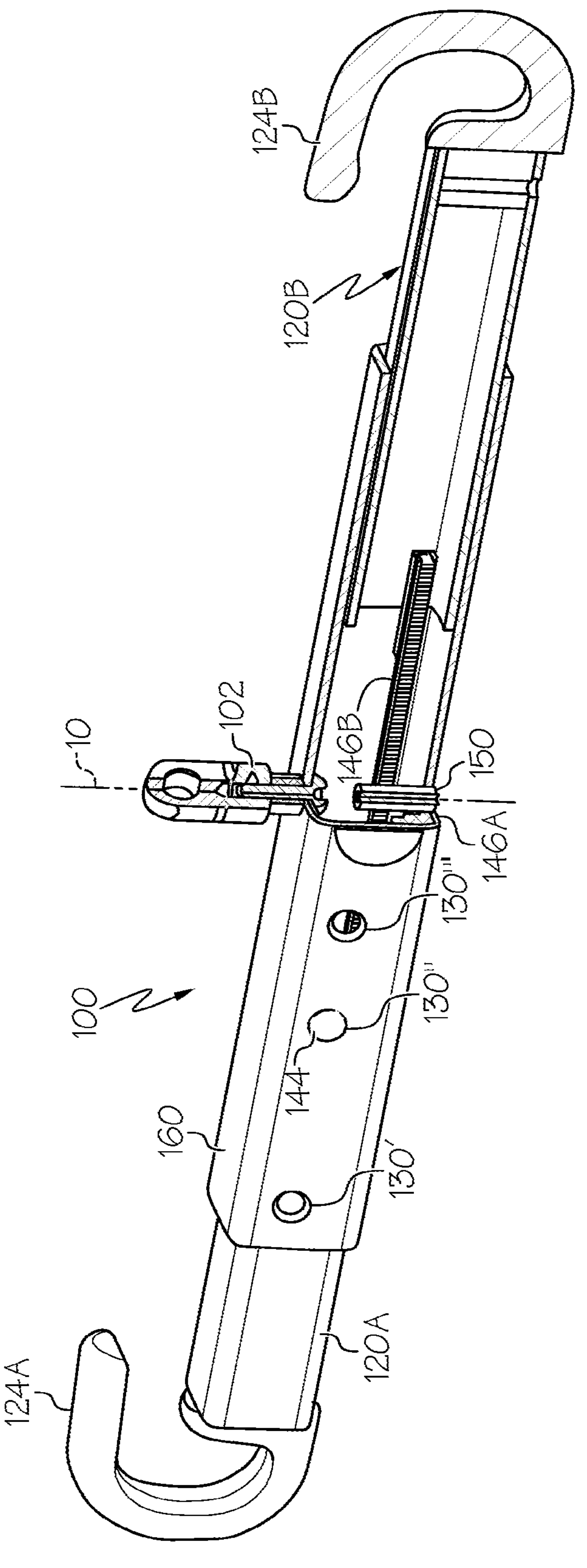
FIG. 10 schematically depicts another sling bar assembly, according to one or more embodiments shown and described herein.

Referring to FIG. 10, a perspective view of another embodiment of the sling bar assembly 100 is schematically depicted. Similar to the embodiments described above and depicted in FIGS. 1-9B, the sling bar assembly 100 includes the first sling bar member 120A and the second sling bar member 120B. Further, the first sling bar member 120A includes the rack 146A and the second sling bar member 120B includes the rack 146B, with the racks 146A, 146B engaged with the lateral governor 150.

However, in the embodiment depicted in FIG. 10, the sling bar frame 160 defines cavities 130', 130", and 130''' which are spaced apart from one another in the lateral direction. In some embodiments, such as the embodiment depicted in FIG. 10, the sling bar frame 160 extends around the first sling bar member 120A and the second sling bar member 120B.

In embodiments, one of the first sling bar member 120A and second sling bar member 120B includes the engagement member 144 that is positionable within the cavities 130', 130", and 130'''. More particularly, in the embodiment depicted in FIG. 10, the engagement member 144 includes a detent that is selectively positioned at least partially within one of the cavities 130', 130", or 130'''. In embodiments, the engagement member 144 is coupled to one of the first sling bar member 120A and the second sling bar member 120B, such that when the engagement member 144 is selectively positioned within one of the cavities 130', 130", or 130''', movement of the one of the first sling bar member 120A or the second sling bar member 120B with respect to the sling bar frame 160 is restricted. Similar to the embodiments described above, through engagement with the lateral governor 150, movement of the first sling bar member 120A and the second sling bar member 120B with respect to one another is restricted. Accordingly, when the engagement member 144 is selectively positioned within one of the cavities 130', 130", or 130''', movement of both the first sling bar member 120A and the second sling bar member 120B with respect to the sling bar frame 160 is restricted. In this way, engagement of the engagement member 144 with one of the cavities 130', 130", or 130''' effectively locks the lateral position of the first sling bar member 120A and the second sling bar member 120B with respect to the sling bar frame 160. In operation, a user may depress the engagement member 144 to unlock the first sling bar member 120A and the second sling bar member 120B, such that the first sling bar member 120A and the second sling bar member 120B are movable with respect to one another. Because the first sling bar member 120A and the second sling bar member 120B are selectively lockable with respect to one another with a single engagement member 144, a user can selectively lock and unlock the first and second sling bar members 120A, 120B with a single hand. While in the embodiment depicted in FIG. 10, the sling bar assembly 100 includes a rectangular prism shape, it should be understood that in embodiments, the components of the sling bar assembly 100 can include any suitable shape, such as a cylindrical shape, a triangular prism shape, or the like.

Figure 11:
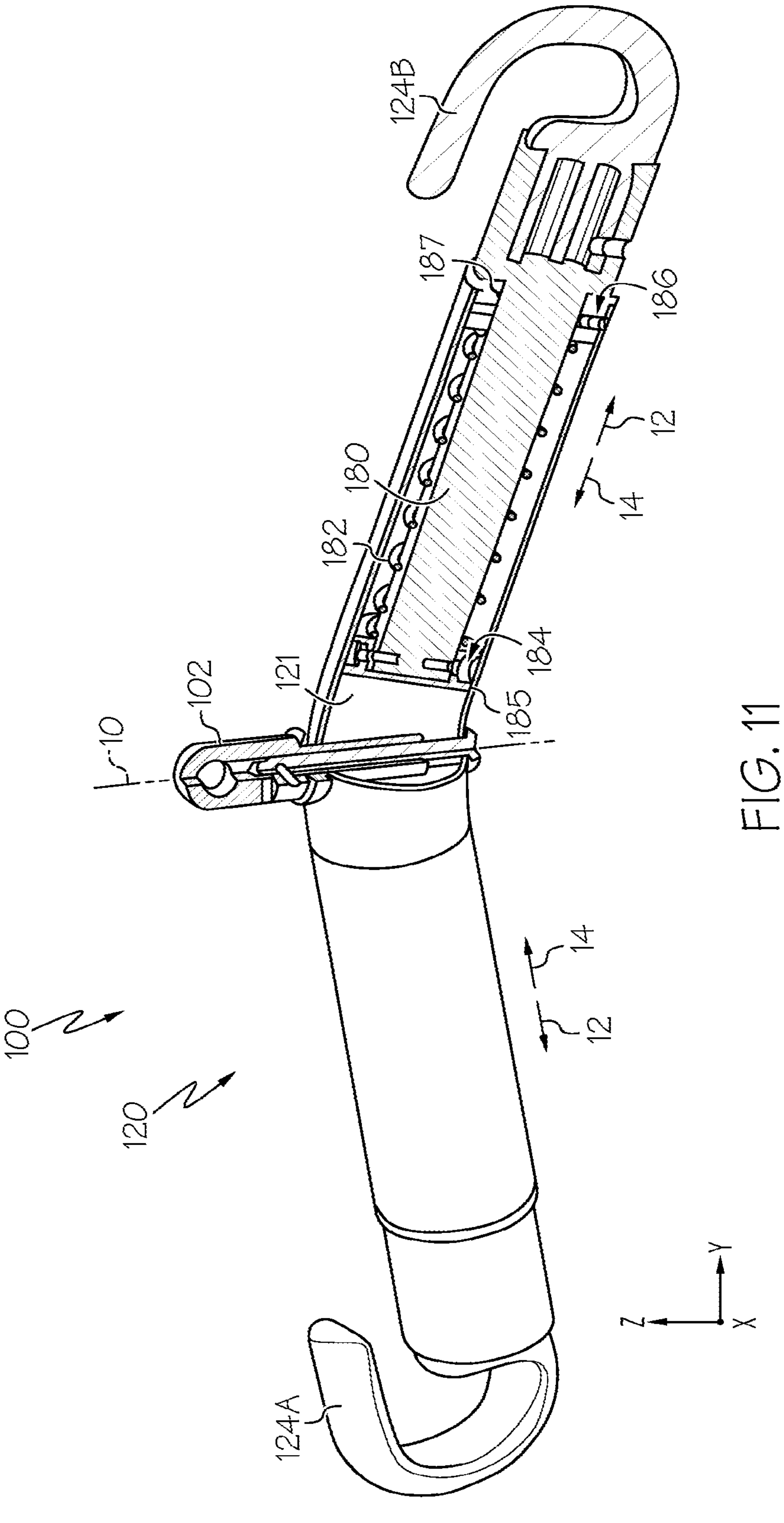
FIG. 11 schematically depicts another sling bar assembly including a biasing member, according to one or more embodiments shown and described herein.

Referring to FIG. 11, another embodiment of the sling bar assembly 100 is schematically depicted. In the embodiment depicted in FIG. 11, the sling bar assembly 100 includes the lift engagement member 102 for selectively coupling to a subject support lift, and a sling bar member 120 extending in the lateral direction. In the embodiment depicted in FIG. 11, the sling bar member 120 defines a channel 121 extending in the lateral direction. In the embodiment depicted in FIG. 11, the channel 121 includes a generally circular shape and the sling bar member 120 includes a cylindrical shape surrounding the channel 121, however, it should be understood that the sling bar member 120 and the channel 121 may include any suitable shape. For example and without limitation, the sling bar member 120 may include a rectangular prism shape, a triangular prism, or the like.

In embodiments, the sling bar assembly 100 includes a plunger 180 positioned at least partially within the channel 121 and slidably engaged with the sling bar member 120. In particular, the plunger 180 is movable within the channel 121 in the lateral direction. In embodiments, the sling hook 124B is positioned at an outboard end of the plunger 180. In some embodiments, the sling hook 124B is coupled to the plunger 180. In some embodiments, the sling hook 124B is monolithic with the plunger 180.

The sling bar assembly 100, in embodiments, further includes a biasing member 182 engaged with the plunger 180 and the sling bar member 120, where the biasing member 182 biases the plunger 180 in the inboard direction (i.e., in direction 14 as depicted) toward the lift engagement member 102. In embodiments, the biasing member 182 may include a compressive spring that biases the plunger 180 in the inboard direction. In some embodiments, the biasing member 182 may include a tension spring, a torsion spring, or the like.

In embodiments, the sling bar assembly 100 further includes a sling bar stopper 186 defining an inner perimeter 187. The sling bar stopper 186 is positioned at the outboard end of the sling bar member 120, and generally acts to retain the plunger 180 within the sling bar member 120. For example, in embodiments, the sling bar assembly 100 includes a plunger stopper 184 positioned at an end of the plunger 180 opposite the sling hook 124B. In embodiments, an outer perimeter 185 of the plunger stopper 184 is greater than the inner perimeter 187 of the sling bar stopper 186. In this way, the plunger stopper 184 and the sling bar stopper 186 act to capture the plunger 180 within the sling bar member 120. While in the view depicted in FIG. 11, a plunger 180 is depicted with the sling hook 124B, it should be understood that in embodiments, the sling bar assembly 100 is symmetric about the lift engagement member 102 in the lateral direction and includes a similar plunger associated with the sling hook 124A.

In some embodiments, the plunger stopper 184 and/or the plunger 180 may include one or more bearings positioned between the plunger stopper 184 and/or the plunger 180 and the sling bar member 120. The bearings generally act to reduce friction between the plunger stopper 184 and/or the plunger 180 and the sling bar member 120.

As a subject is connected to the sling bar assembly 100, for example, through a sling coupled to the sling hooks 124A, 124B, the weight of the subject may overcome or at least partially overcome the biasing member 182, and the plunger 180 and the sling hook 124B may move outboard in the lateral direction (i.e., in direction 12 as depicted). For example, in embodiments, the channel 121 extends outward in the lateral direction and downward in the vertical direction from the lift engagement member 102, such that the downward force associated with the weight of the subject may resolve into forces acting on the plunger in the lateral direction. Without being bound by theory, the larger the subject, the greater the force applied to the sling hooks 124A, 124B, and accordingly, the greater distance the plunger 180 (and accordingly the sling hooks 124A, 124B) moves outboard in the lateral direction.

Figure 12A:
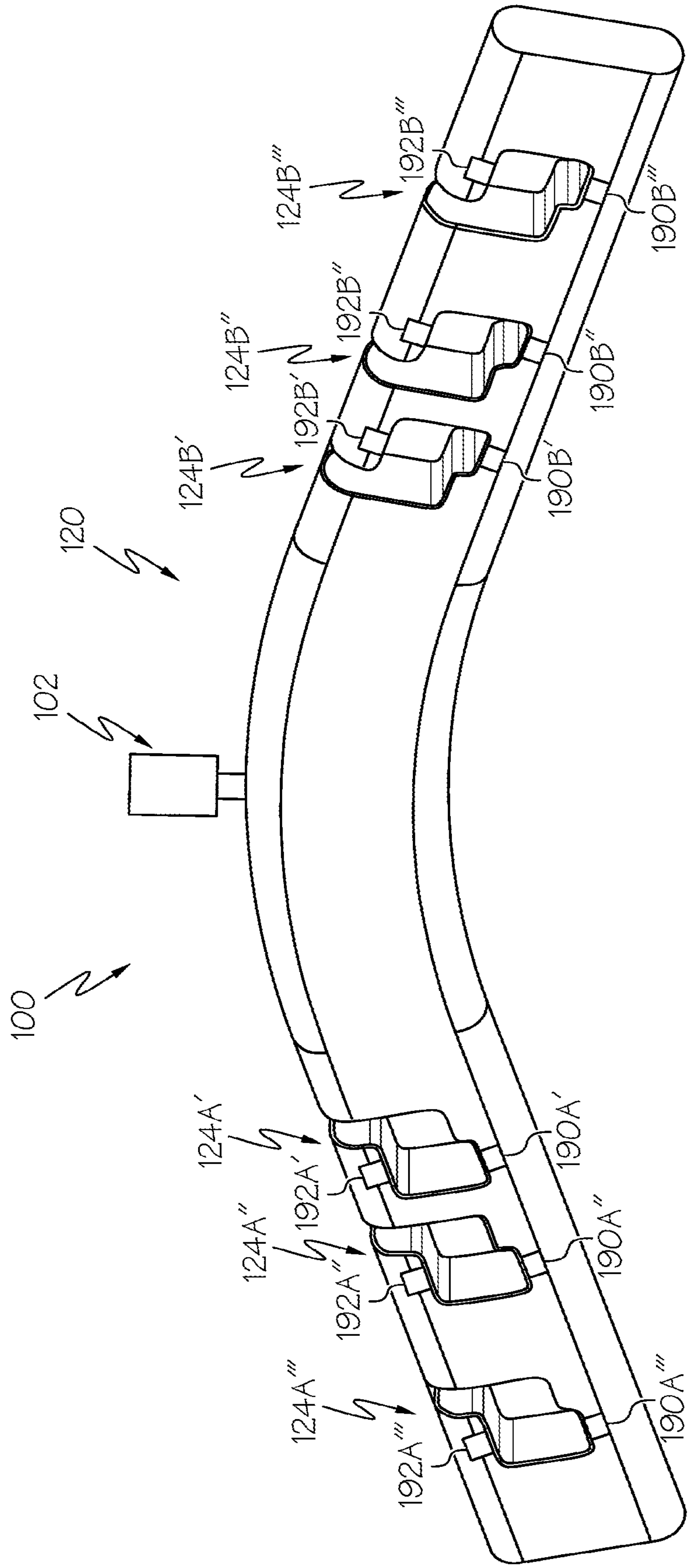
FIG. 12A schematically depicts another sling bar assembly including multiple sling hooks, according to one or more embodiments shown and described herein.

Referring to FIG. 12A, another embodiment of the sling bar assembly 100 is schematically depicted. In the embodiment depicted in FIG. 12A, the sling bar assembly 100 includes the sling bar member 120, and includes multiple pairs of sling hooks spaced apart from one another. For example, in the embodiment depicted in FIG. 12A, the sling bar assembly 100 includes a first pair of sling hooks 124A', 124B' that are spaced apart from the lift engagement member 102 by a first spacing distance. The sling bar assembly 100 further includes a second pair of sling hooks 124A", 124B" that are spaced apart from the lift engagement member 102 by a second spacing distance that is greater than the first spacing distance. In the embodiment depicted in FIG. 12A, the sling bar assembly 100 includes a third pair of sling hooks 124A"', 124B"' that are spaced apart from the lift engagement member 102 by a third spacing distance that is greater than the second spacing distance. While in the embodiment depicted in FIG. 12A, the sling bar assembly 100 includes three pairs of sling hooks (124A', 124B'; 124A", 124B"; 124A"', 124B"'), it should be understood that the sling bar assembly 100 may include any suitable number of pairs of sling hooks. In some embodiments, each of the sling hooks 124A', 124B'; 124A", 124B"; 124A"', 124B"' may include latches that selectively enclose the sling hooks 124A', 124B'; 124A", 124B"; 124A"', 124B"'.

By including multiple pairs of sling hooks that are each spaced apart from the lift engagement member 102 by different distances, a user, such as a caregiver or the like, can selectively position a sling in different pairs of sling hooks to accommodate different sized subjects. It is generally desirable for a user to position a sling in corresponding pairs of sling hooks (i.e., 124A' with 124B'; 124A" with 124B"; 124A"' with 124B"') to ensure that the weight of the subject is balanced in the lateral direction.

In embodiments, the sling bar assembly 100 includes a first pair of sensors 190A', 190B' that are associated with the first pair of sling hooks 124A', 124B', respectively. The sling bar assembly 100, in the embodiment depicted in FIG. 12A, includes a second pair of sensors 190A", 190B" that are associated with the second pair of sling hooks 124A", 124B", respectively. In embodiments, the sling bar assembly 100 includes a third pair of sensors 190A"', 190B"' that are associated with the third pair of sling hooks 124A"', 124B"'. The first pair of sensors 190A', 190B', the second pair of sensors 190A", 190B", and the third pair of sensors 190A"', 190B"' are configured to detect the placement of an object (e.g., a sling) in the first pair of sling hooks 124A', 124B', the second pair of sling hooks 124A", 124B", and the third pair of sling hooks 124A"', 124B"', and may include, for example and without limitation, a proximity sensor, a limit switch, or the like.

In embodiments, the sling bar assembly 100 includes indicators associated with the pairs of sling hooks. For example, in the embodiment depicted in FIG. 12A, the sling bar assembly 100 includes a first pair of indicators 192A', 192B' that are associated with the first pair of sling hooks 124A', 124B', respectively. The sling bar assembly 100, in the embodiment depicted in FIG. 12A, includes a second pair of indicators 192A", 192B" that are associated with the second pair of sling hooks 124A", 124B", respectively. In embodiments, the sling bar assembly 100 includes a third pair of indicators 192A"', 192B"' that are associated with the third pair of sling hooks 124A"', 124B"'. In embodiments, the first pair of indicators 192A', 192B', the second pair of indicators 192A", 192B", and the third pair of indicators 192A"', 192B"' are configured to provide a visual indication, and may include, for example and without limitation, a light emitting diode (LED), or the like.

Figure 12B:
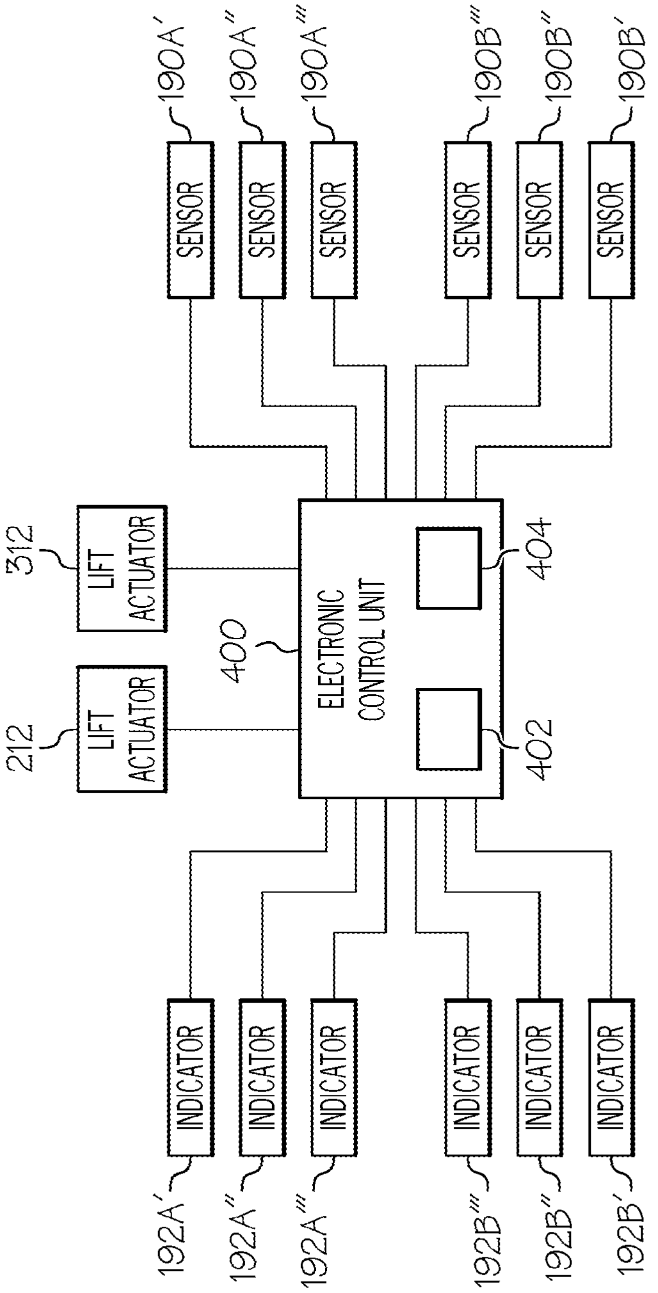
FIG. 12B schematically depicts a control diagram of the sling bar assembly of FIG. 12A, according to one or more embodiments shown and described herein.

Referring to FIGS. 12A and 12B, in embodiments, the indicators 192A', 192A", 192A"', 192B', 192B", 192B"' are communicatively coupled to an electronic control unit 400. In embodiments, the sensors 190A', 190A", 190A"', 190B', 190B", 190B"' are communicatively coupled to the electronic control unit 400. The electronic control unit 400, in embodiments, generally includes a processor 402 and a memory component 404. The memory component 404 may be configured as volatile and/or nonvolatile memory, and as such may include random access memory (including SRAM, DRAM, and/or other types of RAM), flash memory, secure digital (SD) memory, registers, compact discs (CD), digital versatile discs (DVD), bernoulli cartridges, and/or other types of non-transitory computer-readable mediums. The processor 402 may include any processing component operable to receive and execute instructions (such as from the memory component 404). In some embodiments, the electronic control unit 400 is positioned on the sling bar assembly 100. In some embodiments, the electronic control unit 400 may be separate from and communicatively coupled to the sling bar assembly 100.

The electronic control unit 400, in embodiments, is operable to selectively provide an indication via the indicators 192A', 192B', 192A", 192B", 192A"', 192B"' and/or prevent operation of a subject support lift 200, 300 (FIGS. 13, 14) unless a sling is detected in corresponding ones of the pairs of sling hooks 124A', 124B'; 124A", 124B"; and 124A"', 124B"'.

For example, in some embodiments, the electronic control unit 400 is configured to receive a signal from one of the pair of sensors 190A', 190B' associated with one of the first pair of sling hooks 124A', 124B' indicative of a sling positioned in the one of the first pair of sling hooks 124A', 124B'. In response to receiving the signal from the one of the pair of sensors 190A', 190B', the electronic control unit 400 further directs the indicator 192A', 192B' associated with the other of the first pair of sling hooks 124A', 124B' to engage. As an example, to couple a sling to the sling bar assembly 100, a user may position a loop of the sling in sling hook 124A'. The electronic control unit 400 then receives a signal from the sensor 190A' associated with the sling hook 124A' indicative of the sling positioned in the sling hook 124A'. In response to receiving the signal from the sensor 190A', the electronic control unit 400 directs the indicator 192B' associated with the other of the pair of sling hooks (e.g., sling hook 124B') to engage. As noted above, the indicator 192B' can generally include a visual indicator, such as an LED. In this way, the sling bar assembly 100 may provide visual indications to a user to guide the user to couple the sling to corresponding and paired sling hooks. While the example above is described in reference to the first pair of sling hooks 124A', 124B', the first pair of sensors 190A', 190B', and the first pair of indicators 192A', 192B', it should be understood that the second pair of sling hooks 124A", 124B", the second pair of sensors 190A", 190B", and the second pair of indicators 192A", 192B", as well as the third pair of sling hooks 124A'", 124B'", the third pair of sensors 190A'", 190B'", and the third pair of indicators 192A'", 192B'" may operate in the same manner.

In some embodiments, the electronic control unit 400 may additionally or alternatively provide visual indications based at least in part on a subject profile associated with a subject. The electronic control unit 400 may store subject profiles in the memory component 404, and/or may communicatively coupled to a database including different subject profiles. For example, in some embodiments, the electronic control unit 400 may receive a subject profile including a desired placement of a sling on a particular pair of sling hooks 124A', 124B'; 124A", 124B"; or 124A'", 124B'". For example, it may be desired to position the sling in wider sling hooks (i.e., sling hooks 124A'" and 124B'") for a subject identified as a larger subject in his/her subject profile. In this example, the electronic control unit 400 may direct the indicators 192A'", 192B'" to activate, providing a user an indication to utilize sling hooks 124A'" and 124B'" with a particular subject.

Figure 13:
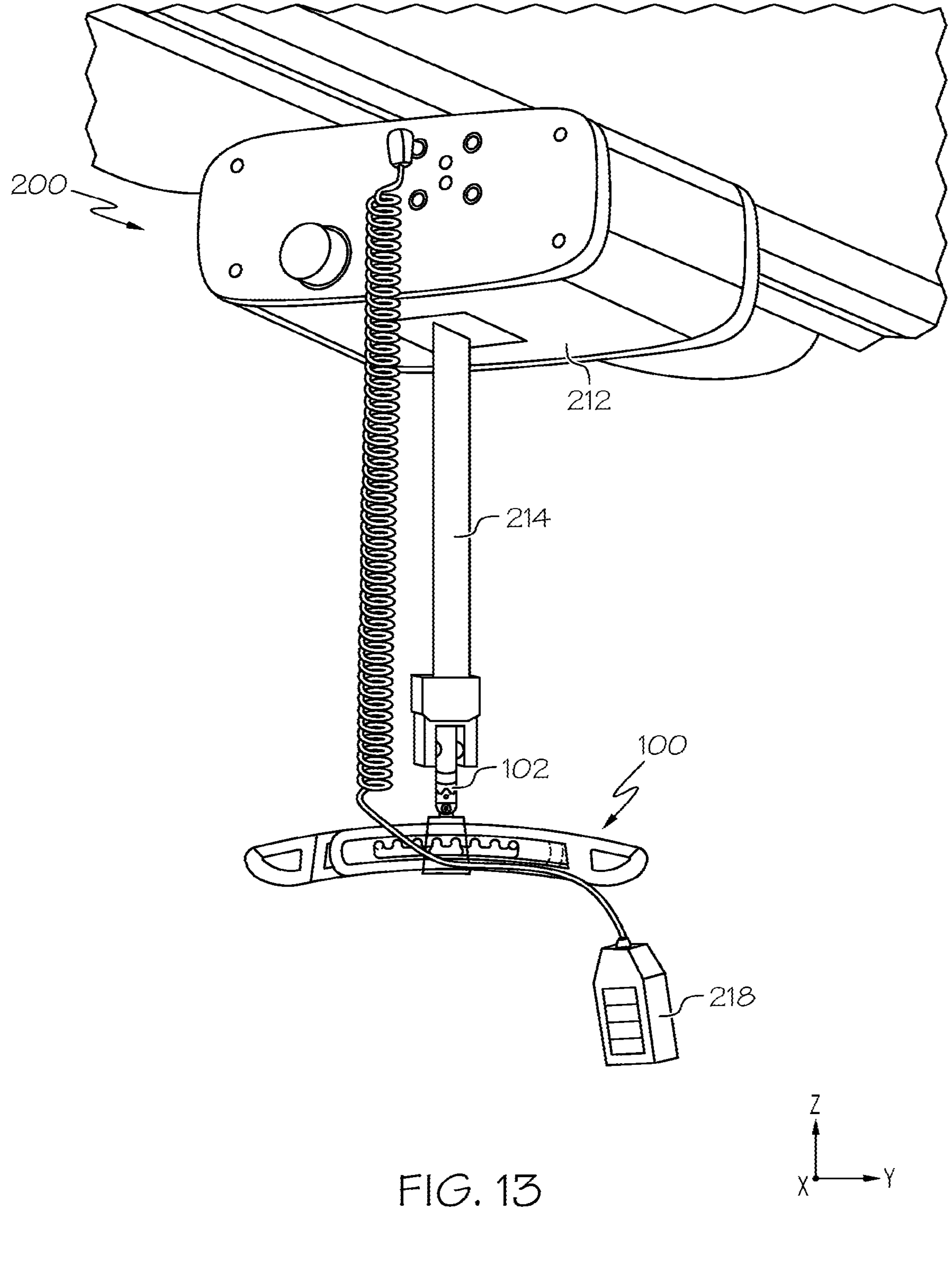
FIG. 13 schematically depicts an overhead lift and a sling bar assembly, according to one or more embodiments shown and described herein.

Referring to FIG. 13, a perspective view of subject support lift 200 suitable for use with the sling bar assembly 100 is schematically depicted. In the embodiment depicted in FIG. 13, the subject support lift 200 is an overhead lift. The subject support lift 200 generally includes a lift actuator 212 that is connected to a strap 214 that may be paid out or taken up by the lift actuator 212 in the vertical direction. In embodiments, the lift actuator 212 may include any suitable device for paying out and taking up the strap 214 in the vertical direction, such as an electric motor, a pneumatically powered device, a hydraulically powered device, or the like. A controller 218 is communicatively coupled to the lift actuator 212, and may be utilized by a user to control the operation of the lift actuator 212. In embodiments, the controller 218 may send signals to the lift actuator 212 causing the lift actuator 212 to pay out or take up the strap 214 in the vertical direction. The lift engagement member 102 is selectively coupled to and removable from the strap 214, such that the lift engagement member 102 may selectively couple the sling bar assembly 100 to the strap 214. As described above, the sling bar assembly 100 may be selectively adjustable in the lateral direction to accommodate a variety of different sized accessories.

Figure 14:
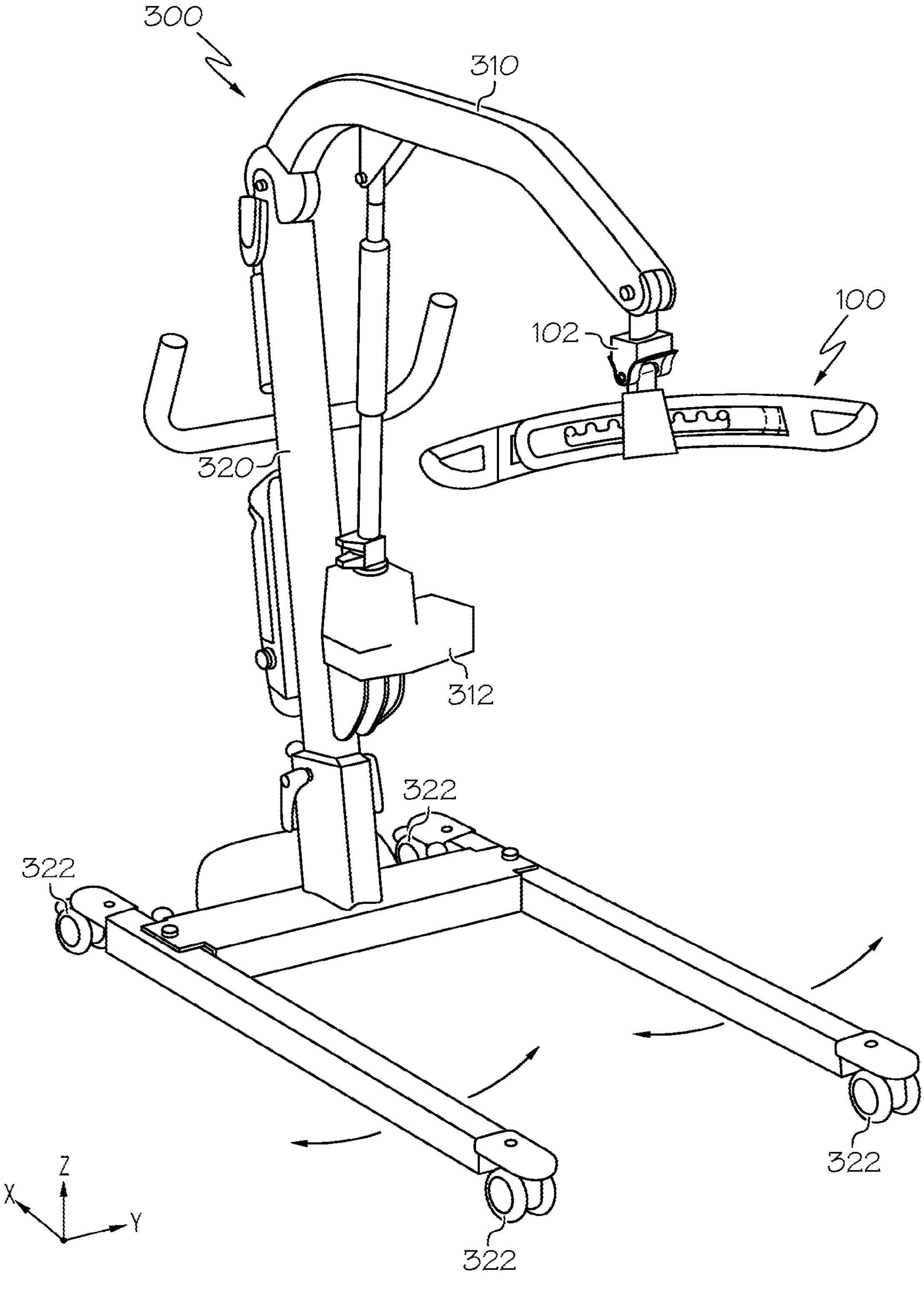
FIG. 14 schematically depicts a mobile lift and a sling bar assembly, according to one or more embodiments shown and described herein.

As another example and referring to FIG. 14, a perspective view of another subject support lift 300 suitable for use with the sling bar assembly 100 is schematically depicted. In the embodiment depicted in FIG. 14, the subject support lift 600 is a mobile lift. The subject support lift 300 generally includes a mast 320 and a movable arm 310 movably coupled to the mast 320. The movable arm 310 may be operatively coupled to a lift actuator 312 that moves at least a portion of the movable arm 310 in the vertical direction. The lift engagement member 102 is selectively coupled to and removable from the strap 214, such that the lift engagement member 102 may selectively couple the sling bar assembly 100 to the movable arm 310. In embodiments, the mast 320 and the movable arm 310 are coupled to wheels or rollers 322, such that the subject support lift 300 may be moved between various locations.

Referring to FIGS. 12A, 12B, 13, and 14, in some embodiments the electronic control unit 400 is communicatively coupled to the lift actuator 212 and/or the lift actuator 312. In some embodiments, the operation of the lift actuator 212 and/or the lift actuator 312 may be directed, at least in part, by the electronic control unit 400. For example, in some embodiments, the electronic control unit 400 is configured to receive a signal from one of the first pair of sensors 190A', 190B' associated with one of the first pair of sling hooks 124A', 124B' indicative of a sling positioned in the one of the first pair of sling hooks 124A', 124B'. In response to receiving a signal from the sensor 190A' or 190B' associated with the other of the first pair of sling hooks 124A', 124B' indicative of a sling positioned in the other of the first pair of sling hooks 124A', 124B', the electronic control unit 400 sends a signal to the lift actuator 212 and/or the lift actuator 312 permitting the lift actuator 212 and/or the lift actuator 312 to move. In response to the lack of a signal from the sensor 190A' or 190B' associated with the other of the first pair of sling hooks 124A', 124B' indicative of a sling positioned in the other of the first pair of sling hooks 124A', 124B', the electronic control unit 400 a signal to the lift actuator 212 and/or the lift actuator 312 to restrict movement of the lift actuator 212 and/or 312.

As an example, to couple a sling to the sling bar assembly 100, a user may position a loop of the sling in the sling hook 124A'. The electronic control unit 400 then receives a signal from the sensor 190A' associated with the sling hook 124A' indicative of the sling positioned in the sling hook 124A'. If the user positions another loop of the sling in the sling hook 124B', the electronic control unit 400 then receives a signal from the sensor 190B' associated with the sling hook 124B' indicating that the sling is positioned in both the first pair of sling hooks 124A', 124B'. In response to receiving signals from both the first pair of sensors 190A', 190B' indicating that the sling is positioned in both the first pair of sling hooks 124A', 124B', the electronic control unit 400 sends a signal to the lift actuator 212 and/or the lift actuator 312 permitting the lift actuator 212 and/or the lift actuator 312 to move.

However, if the electronic control unit 400 does not receive a signal from both the first pair of sensors 190A', 190B' indicating that the sling is positioned in both the first pair of sling hooks 124A', 124B' (e.g., if the sling is only positioned in one of the first pair of sling hooks 124A', 124B'), the electronic control unit 400 directs the lift actuator 212 and/or the lift actuator 312 to restrict movement of the lift actuator 212 and/or the lift actuator 312. In this way, operation of the lift actuator 212 and/or the lift actuator 312 may be restricted unless the first pair of sensors 190A', 190B' confirms the appropriate connection of the sling in the first pair of sling hooks 124A', 124B'. While the example above is described in reference to the first pair of sling hooks 124A', 124B' and the first pair of sensors 190A', 190B', it should be understood that the second pair of sling hooks 124A", 124B" and the second pair of sensors 190A", 190B", as well as the third pair of sling hooks 124A'", 124B'" and the third pair of sensors 190A'", 190B'" may operate in the same manner.

In some embodiments, the electronic control unit 400 may additionally or alternatively restrict operation of the lift actuator 212 and/or the lift actuator 312 based at least in part on a subject profile associated with a subject. The electronic control unit 400 may store subject profiles in the memory component 404, and/or may communicatively coupled to a database including different subject profiles. For example, in some embodiments, the electronic control unit 400 may receive a subject profile including a desired placement of a sling on a particular pair of sling hooks 124A', 124B'; 124A", 124B"; or 124A'", 124B'". For example, it may be desired to position the sling in wider sling hooks (i.e., sling hooks 124A'" and 124B'") for a subject identified as a larger subject in his/her subject profile. In this example, the electronic control unit 400 may send a signal to the lift actuator 212 and/or the lift actuator 312 allowing the lift actuator 212 and/or the lift actuator 312 to move upon receiving a signal from the sensors 190A'", 190B'" indicating that the sling is positioned in the sling hooks 124A'" and 124B'". However, the electronic control unit 400 may direct the lift actuator 212 and/or the lift actuator 312 to restrict movement of the lift actuator 212 and/or the lift actuator 312 if signals are not received from the sensors 190A'", 190B'" indicating that the sling is positioned in the sling hooks 124A'" and 124B'".

Accordingly, it should now be understood that described herein are directed to sling bar assemblies that include variable span in a lateral direction. In some embodiments described herein, sling bar assemblies generally include opposing sling bar members slidably engaged with a lift engagement member. Because the sling bar members are movable with respect to one another in the lateral direction, the span of the sling bar assembly may be adjusted to accommodate different sized accessories. By accommodating different sized accessories, sling bar assemblies described herein may reduce the need for care facilities to stock and maintain different sized sling bars and for caregivers to correlate appropriate sling bar assemblies with appropriate accessories.

In some embodiments described herein, the sling bar members are selectively engaged with one another and are repositionable between a locked position, in which movement of the sling bar members with respect to one another is restricted in the lateral direction, and an unlocked position, in which the sling bar members are movable with respect to one another in the lateral direction. By selectively locking the sling bar members with respect to one another, a user may change the width of the sling bar assembly to accommodate different sized accessories.

In some embodiments, sling bar assemblies described herein include sling bar members with sling hooks engaged with biasing members. The biasing members allow the width of the sling bar assembly to expand upon the application of force to the sling bar assembly, such that the width of the sling bar increases as the size of a subject connected to the sling bar assembly increases.

In some embodiments, sling bar assemblies include multiple pairs of sling hooks positioned at different widths on the sling bar assembly. Sensors and/or indicators may be associated with different pairs of sling hooks to assist a user in positioning a sling in appropriate sling hooks for a particular subject.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A sling bar assembly comprising:

a lift engagement member for selectively coupling to a subject support lift; and a first sling bar member comprising:

a first sling hook positioned at an outboard end of the first sling bar member in a lateral direction; and a first cavity extending into the first sling bar member, the first cavity defining a first guide portion and a first plurality of slots;

an opposing second sling bar member comprising:

a second sling hook positioned at an outboard end of the second sling bar member in the lateral direction; and a second engagement member selectively positionable within the first plurality of slots of the first sling bar member, wherein the first sling bar member and the second sling bar member are slidably engaged with the lift engagement member, wherein the second engagement member is selectively positioned at least partially within the first cavity and restricts movement of the first sling bar member and the second sling bar member with respect to one another in the lateral direction when positioned at least partially within the first cavity.

2. The sling bar assembly of claim 1, wherein the first sling bar member and the second sling bar member are repositionable between a locked position, in which movement of the first sling bar member and the second sling bar member with respect to one another is restricted in the lateral direction, and an unlocked position, in which the first sling bar member and the second sling bar member are movable with respect to one another in the lateral direction.

3. The sling bar assembly of claim 2, wherein, when in the locked position, the second engagement member is received within one of the first plurality of slots and wherein, when in the unlocked position, the second engagement member is slidably movably within the first guide portion.

4. The sling bar assembly of claim 1, wherein the first sling bar member further comprises a first engagement member, and the second sling bar member further comprises a second cavity extending into the second sling bar member, the second cavity defining a second guide portion and a second plurality of slots.

5. The sling bar assembly of claim 4, wherein the first engagement member is selectively positioned at least partially within the second cavity and restricts movement of the first sling bar member and the second sling bar member with respect to one another in the lateral direction when positioned at least partially within the second cavity.

6. The sling bar assembly of claim 4, wherein the first plurality of slots extend upward in a vertical direction from the first guide portion, and the second plurality of slots extend upward in the vertical direction from the second guide portion.

7. The sling bar assembly of claim 4, wherein the first cavity is positioned between the first engagement member and the first sling hook, and wherein the second cavity is positioned between the second engagement member and the second sling hook.

8. The sling bar assembly of claim 1, wherein the second engagement member defines a height in a vertical direction less than a height of the first guide portion in the vertical direction.

9. The sling bar assembly of claim 1, wherein the first cavity defines first a plurality of crests separating the first plurality of slots from one another.

10. A subject support lift comprising:

a lift actuator; and a sling bar assembly comprising:

a lift engagement member for selectively coupling to the subject support lift; and a first sling bar member comprising:

a first sling hook positioned at an outboard end of the first sling bar member in a lateral direction; and a first cavity extending into the first sling bar member, the first cavity defining a first guide portion and a first plurality of slots;

an opposing second sling bar member comprising:

a second sling hook positioned at an outboard end of the second sling bar member in the lateral direction; and a second engagement member selectively positionable within the first plurality of slots of the first sling bar member, wherein the first sling bar member and the second sling bar member are slidably engaged with the lift engagement member, wherein the second engagement member is selectively positioned at least partially within the first cavity and restricts movement of the first sling bar member and the second sling bar member with respect to one another in the lateral direction when positioned at least partially within the first cavity.

11. The sling bar assembly of claim 10, wherein the first sling bar member and the second sling bar member are repositionable between a locked position, in which movement of the first sling bar member and the second sling bar member with respect to one another is restricted in the lateral direction, and an unlocked position, in which the first sling bar member and the second sling bar member are movable with respect to one another in the lateral direction.

12. The sling bar assembly of claim 11, wherein, when in the locked position, the second engagement member is received within one of the first plurality of slots and wherein, when in the unlocked position, the second engagement member is slidably movably within the first guide portion.

13. The sling bar assembly of claim 10, wherein the first sling bar member further comprises a first engagement member, and the second sling bar member further comprises a second cavity extending into the second sling bar member, the second cavity defining a second guide portion and a second plurality of slots.

14. The sling bar assembly of claim 13, wherein the first engagement member is selectively positioned at least partially within the second cavity and restricts movement of the first sling bar member and the second sling bar member with respect to one another in the lateral direction when positioned at least partially within the second cavity.

15. The sling bar assembly of claim 13, wherein the first plurality of slots extend upward in a vertical direction from the first guide portion, and the second plurality of slots extend upward in the vertical direction from the second guide portion.

16. The sling bar assembly of claim 13, wherein the first cavity is positioned between the first engagement member and the first sling hook, and wherein the second cavity is positioned between the second engagement member and the second sling hook.

17. The sling bar assembly of claim 10, wherein the second engagement member defines a height in a vertical direction less than a height of the first guide portion in the vertical direction.

18. The sling bar assembly of claim 10, wherein the first cavity defines a first plurality of crests separating the first plurality of slots from one another.

* * * * *